United States Patent
Tsukada et al.

(10) Patent No.: US 11,630,612 B2
(45) Date of Patent: Apr. 18, 2023

(54) PRINTING DEVICE AND CONTROL METHOD FOR PRINTING DEVICE

(71) Applicant: SEIKO EPSON CORPORATION, Tokyo (JP)

(72) Inventors: Toshihiro Tsukada, Shiojiri (JP); Takehisa Uemura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/303,560

(22) Filed: Jun. 2, 2021

(65) Prior Publication Data

US 2021/0382665 A1    Dec. 9, 2021

(30) Foreign Application Priority Data

Jun. 5, 2020  (JP) .............................. JP2020-098284

(51) Int. Cl.
*G06F 3/12*    (2006.01)
(52) U.S. Cl.
CPC .......... *G06F 3/1207* (2013.01); *G06F 3/1259* (2013.01)
(58) Field of Classification Search
None
See application file for complete search history.

(56) References Cited

U.S. PATENT DOCUMENTS

| 2007/0223982 | A1* | 9/2007 | Miller | .................. | B41J 3/46 |
| | | | | | 400/88 |
| 2008/0075512 | A1* | 3/2008 | Gates | .................. | H04N 1/107 |
| | | | | | 400/88 |
| 2018/0250947 | A1 | 9/2018 | Nakata et al. | | |

FOREIGN PATENT DOCUMENTS

JP    2018-144338 A    9/2018

* cited by examiner

*Primary Examiner* — Fan Zhang
(74) *Attorney, Agent, or Firm* — Workman Nydegger

(57) ABSTRACT

A printing device printing on a medium while being manually moved in relation to the medium is provided. The printing device includes: a movement detection unit detecting an amount of movement of the printing device in relation to the medium; and a control unit causing a print head to print a print image according to the amount of movement of the printing device detected by the movement detection unit, and causing a display to display a display image showing a current printing position in the print image according to the amount of movement of the printing device detected by the movement detection unit.

6 Claims, 24 Drawing Sheets

PRINTING DEVICE AND CONTROL METHOD FOR PRINTING DEVICE

The present application is based on, and claims priority from JP Application Serial Number 2020-098284, filed Jun. 5, 2020, the disclosure of which is hereby incorporated by reference herein in its entirety.

BACKGROUND

1. Technical Field

The present disclosure relates to a printing device and a control method for a printing device.

2. Related Art

According to the related art, a handy mobile printer printing a print image on a medium by a print head while being manually moved in relation to the medium is known, as disclosed in JP-A-2018-144338.

With the handy mobile printer disclosed in JP-A-2018-144338, a user cannot view the state of a print image being printed by the print head. Therefore, the user may carry out a wrong operation such as moving the printing device away from the medium before the printing is finished.

SUMMARY

A printing device according to an aspect of the present disclosure prints on a medium while being manually moved in relation to the medium. The printing device includes: a movement detection unit detecting an amount of movement of the printing device in relation to the medium; a print head; a display unit; and a control unit causing the print head to print a print image according to the amount of movement of the printing device detected by the movement detection unit, and causing the display unit to display a display image showing a current printing position in the print image according to the amount of movement of the printing device detected by the movement detection unit.

A control method for printing device according to another aspect of the present disclosure is a method for controlling a printing device printing on a medium while being manually moved in relation to the medium. The control method executes: causing a print head to print a print image according to an amount of movement of the printing device in relation to the medium; and causing a display unit to display a display image showing a current printing position in the print image according to the amount of movement of the printing device in relation to the medium.

DESCRIPTION OF EXEMPLARY EMBODIMENTS

An embodiment of a printing device and a control method for a printing device will now be described with reference to the accompanying drawings.

Figure 1:
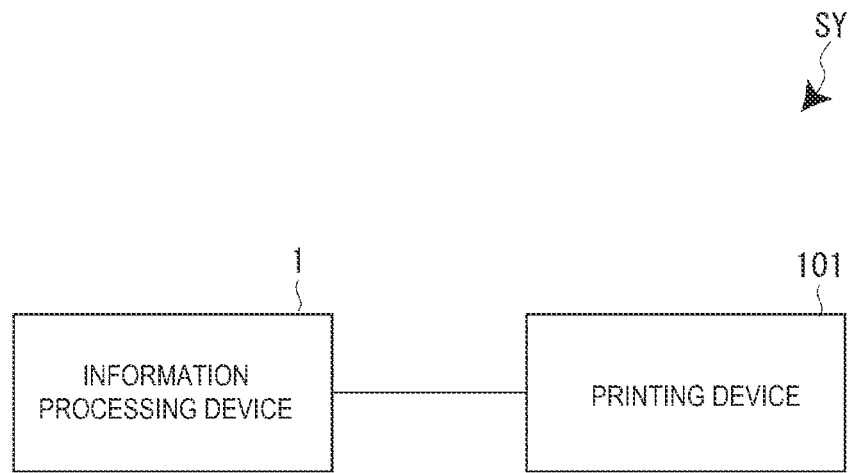
FIG. 1 shows the system configuration of a printing system.

FIG. 1 shows the system configuration of a printing system SY. The printing system SY has an information processing device 1 and a printing device 101. The information processing device 1 and the printing device 101 are coupled in such a way as to be able to communicate via a wire or wirelessly.

The information processing device 1 transmits a print job to the printing device 101. As the information processing device 1, for example, a smartphone, tablet terminal, personal computer or the like can be used.

The printing device 101 prints on a medium 201 (see FIG. 5), based on a print job received from the information processing device 1. The printing device 101 is a so-called handy printer and prints on the medium 201 while being manually moved in relation to the medium 201. The medium 201 is not limited to a print sheet. For example, an envelope, postcard, business card, cardboard, notebook sheet, CD (compact disc) or the like can be used.

Figure 2:
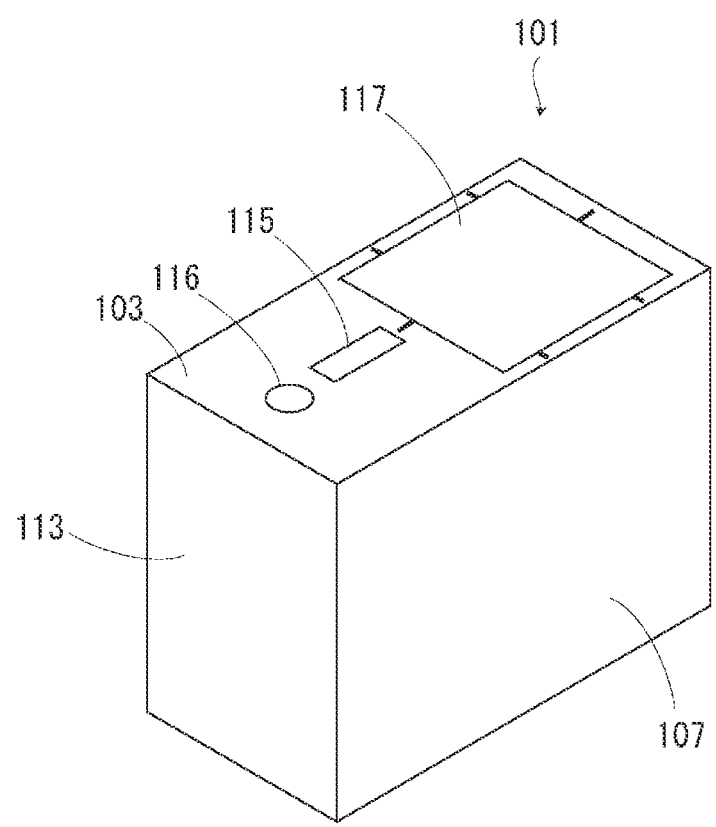
FIG. 2 is an external perspective view of a printing device.
Figure 2:
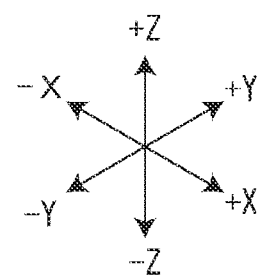

The external configuration of the printing device 101 will now be described with reference to FIGS. 2 and 3. In the description below, a direction as viewed from the printing device 101 is described using a direction in an XYZ coordinate system illustrated in each drawing. However, such directions are solely for the sake of convenience of the description and should not limit the embodiment described below.

The printing device 101 is formed substantially in the shape of a rectangular parallelepiped. Of the six outer surfaces of the printing device 101, an outer surface where a print button 115, described later, is provided is referred to as a first outer surface 103. An outer surface opposite to the first outer surface 103 is referred to as a second outer surface 105. Of the four outer surfaces equivalent to the lateral surfaces when the first outer surface 103 or the second outer surface 105 is defined as the bottom surface, one of the two outer surfaces having a large area is referred to as a third outer surface 107 and the other is referred to as a fourth outer surface 109. Also, of the four outer surfaces equivalent to the lateral surfaces, one of the two outer surfaces having a small area is referred to as a fifth outer surface 111 and the other is referred to as a sixth outer surface 113. That is, the first outer surface 103, the second outer surface 105, the third outer surface 107, the fourth outer surface 109, the fifth outer surface 111, and the sixth outer surface 113 are provided in a +Z-direction, a −Z-direction, a +X-direction, a −X-direction, a +Y-direction, and a −Y-direction, respectively, as viewed from the printing device 101.

At the first outer surface 103 of the printing device 101, the print button 115, a power button 116, and a display 117 are provided. The display 117 is an example of a "display unit".

Figure 5:
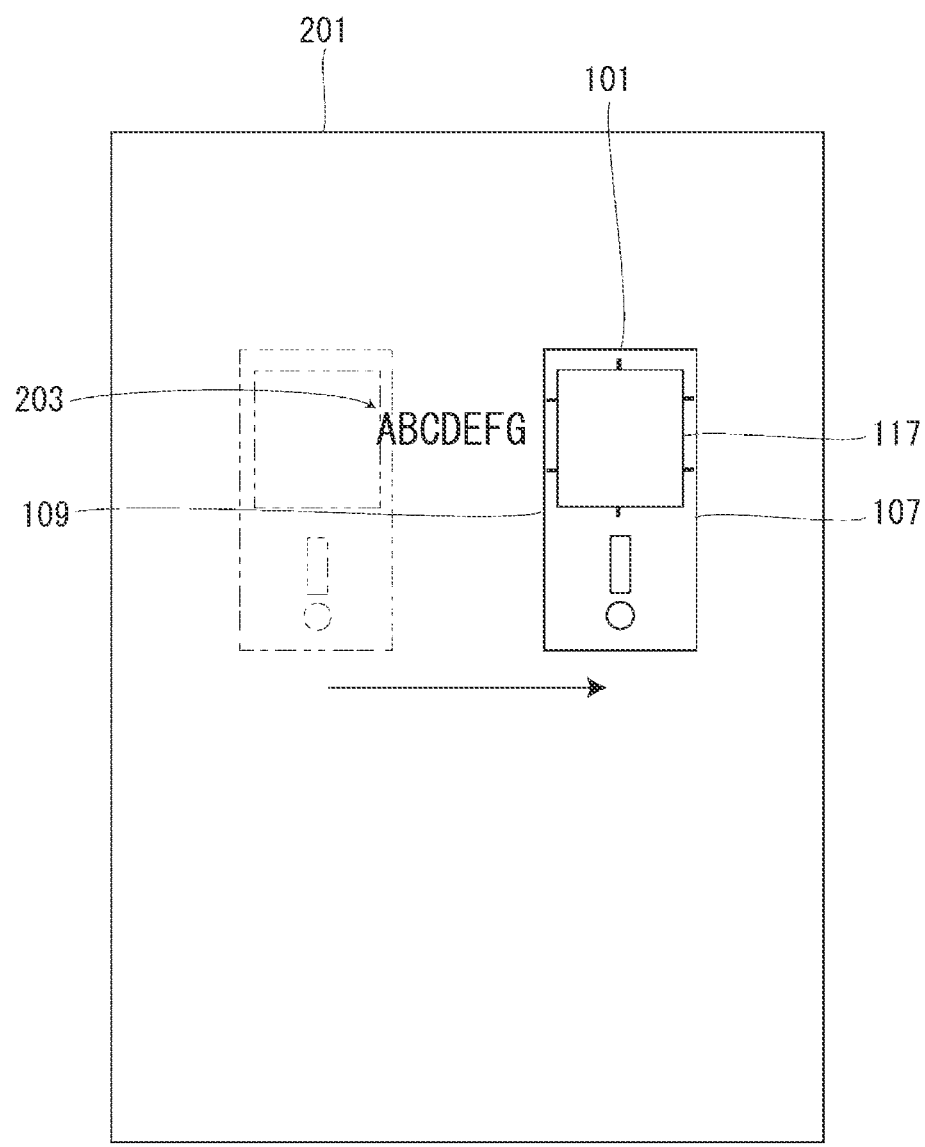
FIG. 5 shows a state where the printing device is moved in a +X-direction.

The print button 115 accepts a print start instruction from a user 301 (see FIG. 5). The print start instruction from the user 301 is given, for example, by a short press on the print button 115. The print button 115 is provided in the −Y-direction in relation to a center part of the first outer surface 103. The user 301 places the printing device 101 on the medium 201, subsequently gives a short press on the print button 115, then moves freehand the printing device 101 held in the hand along the surface of the medium 201, and thus can cause the printing device 101 to print a print image 203 (see FIG. 5).

The power button 116 accepts an instruction to switch on or off the power from the user 301. The power button 116 is provided in the −Y-direction in relation to the print button 115.

The display 117 displays a display image 303 (see FIG. 11) corresponding to a printed part including a current printing position 311 (see FIG. 10) in the print image 203. The current printing position 311 refers to a position printed by a print head 121 (see FIG. 3), described later, in the print image 203. As the printing device 101 moves, the printing device 101 causes the display 117 to display the display image 303 showing the current printing position 311 in the print image 203. The display 117 is provided in the +Y-direction in relation to the center part of the first outer surface 103.

Figure 3:
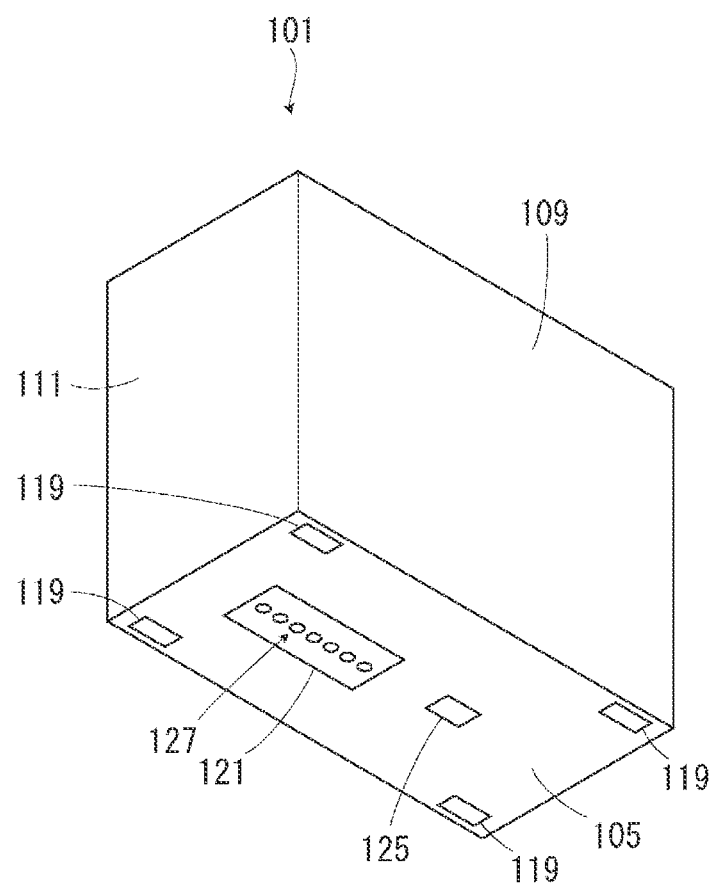
FIG. 3 is an external perspective view of the printing device as viewed from a different angle from FIG. 2.
Figure 3:
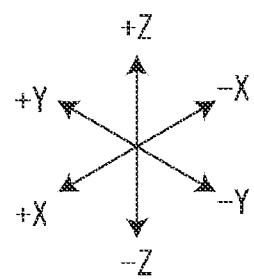

As shown in FIG. 3, at the second outer surface 105 of the printing device 101, a plurality of rollers 119, the print head 121, and a movement detection sensor 125 are provided.

The plurality of rollers 119 slide and rotate in contact with the medium 201 and thus guide the movement of the printing device 101 in the X-direction in relation to the medium 201.

The print head 121 is an inkjet head having a nozzle array 127 including a plurality of nozzles arrayed in the Y-direction. The print head 121 ejects ink from each nozzle and thus prints the print image 203 on the medium 201. The print head 121 is provided in the +Y-direction in relation to a center part of the second outer surface 105. That is, the print head 121 is provided in the −Z-direction in relation to the display 117.

The movement detection sensor 125 optically scans very small recesses and protrusions on the medium 201 while the printing device 101 is moved in relation to the medium 201, and thus outputs a movement detection signal. The printing device 101 detects an amount of movement and a direction of movement in the X-direction and the Y-direction, based on the movement detection signal outputted from the movement detection sensor 125. The movement detection sensor 125 is provided in the −Y-direction in relation to the print head 121.

Figure 4:
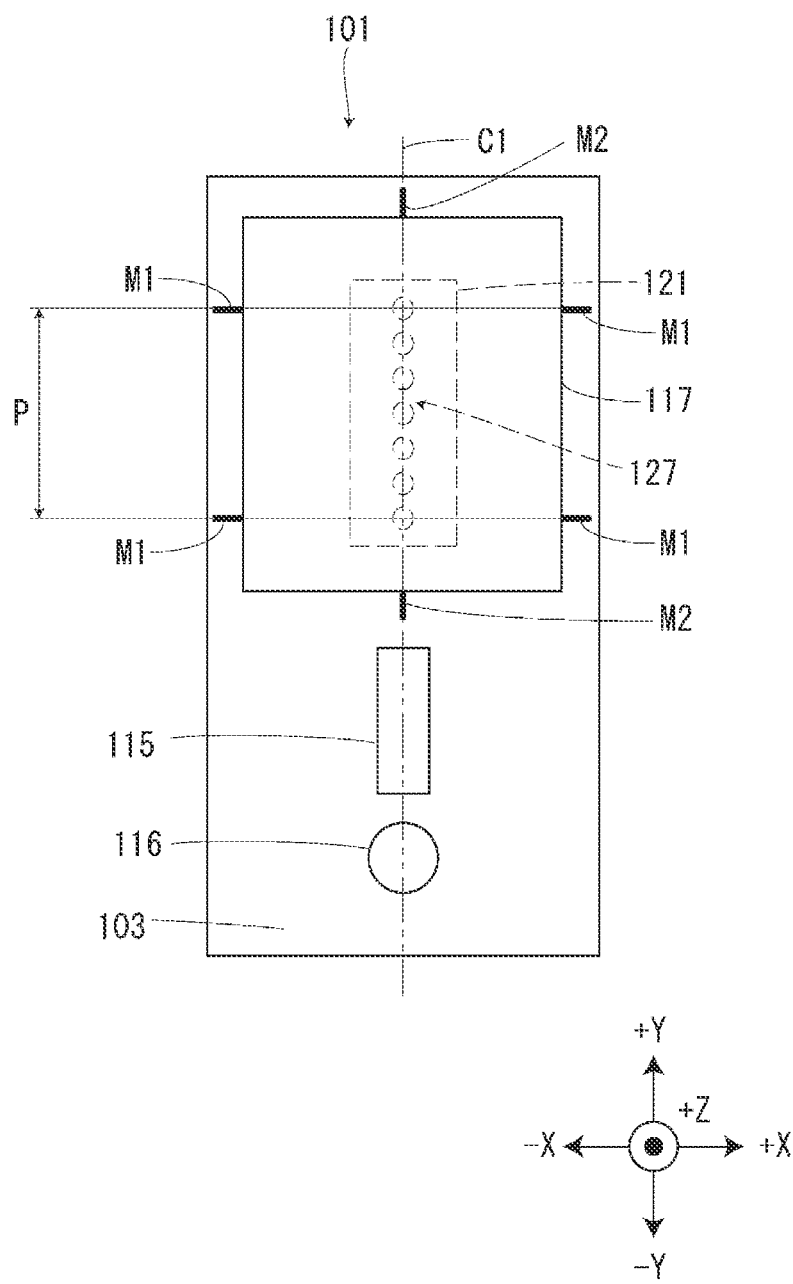
FIG. 4 shows the printing device as viewed from a +Z-direction.

As shown in FIG. 4, the display 117 is located at a position corresponding to the print head 121. That the display 117 is located at a position corresponding to the print head 121 means that the print head 121 is included in the display 117 as viewed from a direction perpendicular to the display surface of the display 117.

A plurality of marks M are provided around the display 117 on the first outer surface 103 of the printing device 101. The plurality of marks M are provided, for example, as printed around the display 117. Of the plurality of marks M, four marks M provided in the −X-direction and the +X-direction in relation to the display 117, that is, first marks M1, correspond to a printable range P of the print head 121. More specifically, of the four first marks M1, two first marks M1 provided in the −X-direction in relation to the display 117 correspond to an end in the +Y-direction and an end in the −Y-direction of the printable range P. Similarly, two first marks M1 provided in the +X-direction in relation to the display 117 correspond to an end in the +Y-direction and an end in the −Y-direction of the printable range P. The printable range P is a range decided according to the arrangement of the plurality of nozzles included in the nozzle array 127. In the example shown in FIG. 4, the printable range P is a range from a nozzle at an end in the +Y-direction to a nozzle at an end in the −Y-direction of the nozzle array 127.

Meanwhile, of the plurality of marks M, two marks M provided in the +Y-direction and the −Y-direction in relation to the display 117, that is, second marks M2, correspond to the position of the nozzle array 127 in the X-direction. That is, the nozzle array 127 is arranged on a line connecting these two second marks M2, as viewed from the +Z-direction. In the printing device 101 in this embodiment, the print head 121 is arranged in such a way that the nozzle array 127 is located at the center in the X-direction of the second outer surface 105. Therefore, the two second marks M2 are provided on a centerline C1 indicating the center position in the X-direction of the first outer surface 103.

As shown in FIG. 5, the printing device 101 can print the print image 203 on the medium 201 while the printing device 101 is moved in the +X-direction as viewed from the printing device 101. Also, the printing device 101 can print the print image 203 on the medium 201 while the printing device 101 is moved in the −X-direction as viewed from the printing device 101. That the printing device 101 is moved in the +X-direction as viewed from the printing device 101 means that the printing device 101 is moved in such a way that the third outer surface 107 becomes the front face. That the printing device 101 is moved in the −X-direction as viewed from the printing device 101 means that the printing device 101 is moved in such a way that the fourth outer surface 109 becomes the front face.

When unable to execute a print job in one path, the printing device 101 can execute the print job divided into a plurality of paths. The path refers to a print operation carried out while the printing device 101 is moved in one direction of the +X-direction and the −X-direction.

When executing one print job divided into a plurality of paths in this way, the user 301 can select either one-direction print or two-direction print in terms of the direction of movement, via the information processing device 1. For example, when one-direction print is selected, the printing device 101 repeats an operation of printing in one path while moving in the +X-direction and subsequently moving in the −X-direction and the −Y-direction to start a new line. Meanwhile, when two-direction print is selected, the printing device 101 repeats an operation of printing in one path while moving in the +X-direction, subsequently moving in the −Y-direction to start a new line, then printing in the next path while moving in the −X-direction, and subsequently moving in the −Y-direction to start a new line.

A print job designates a direction of movement of the printing device 101 for each path. In the description below, a print job divided on a path basis is referred to as "path-based job". For example, in one-direction print, the designated direction is the +X-direction for all path-based jobs. In two-direction print, the designated direction is the +X-direction for path-based jobs of odd ordinal numbers and the designated direction is the −X-direction for path-based jobs of even ordinal numbers.

Print data included in a path-based job corresponds to the designated direction of movement of the printing device 101. For example, a path-based job in which the designated direction is the +X-direction includes print data such that a proper print image 203 is printed when the printing device 101 is moved in the +X-direction. A path-based job in which the designated direction is the −X-direction includes print data such that a proper print image 203 is printed when the printing device 101 is moved in the −X-direction.

The hardware configuration of the printing system SY will now be described with reference to FIG. 6. The printing system SY has the information processing device 1 and the printing device 101. The information processing device 1 has an operation/display unit 11, a processing device-side communication unit 13, and a processing device-side control unit 15.

The operation/display unit 11 is, for example, a touch panel and is used for various operations by the user 301 and to display various kinds of information. The operation/display unit 11 displays, for example, a print instruction screen 21 (see FIG. 7) and a print setting screen 31 (see FIG. 8).

Figure 7:
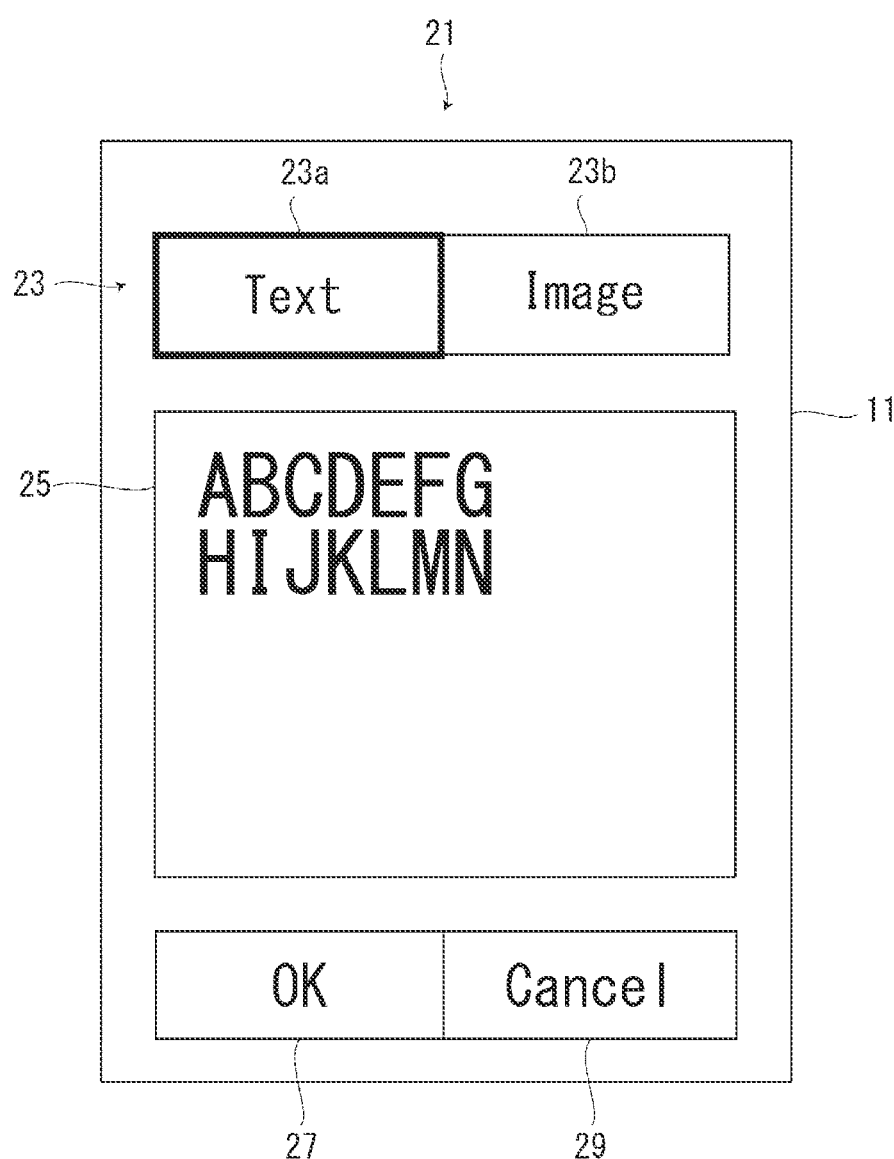
FIG. 7 shows a print instruction screen.

The print instruction screen 21 and the print setting screen 31 will now be described. As shown in FIG. 7, the print instruction screen 21 is provided with a print type selection section 23, an information input section 25, a first OK button 27, and a first cancel button 29.

In the print type selection section 23, a text option 23a and an image option 23b are displayed in a selectable manner. When the text option 23a is selected in the print type selection section 23, a text is inputted to the information input section 25. The text refers to information provided with a text code, such as a letter, numeral, symbol or emoji inputted from a software keyboard, not illustrated. When the image option 23b is selected in the print type selection section 23, an image is drawn or inserted in the information input section 25. The image refers to information that is not provided with a text code.

In the information input section 25, a text inputted when the text option 23a is selected in the print type selection section 23 is displayed. Also, in the information input section 25, an image drawn or inserted when the image option 23b is selected in the print type selection section 23 is displayed.

The first OK button 27 accepts an operation for confirming an input of information on the print instruction screen 21. When accepting an operation on the first OK button 27, the information processing device 1 confirms the input of information and displays the print setting screen 31. The first cancel button 29 accepts an operation for canceling an input of information on the print instruction screen 21. When receiving an operation on the first cancel button 29, the information processing device 1 resets the information inputted on the print instruction screen 21 and displays an initial screen, not illustrated.

Figure 8:
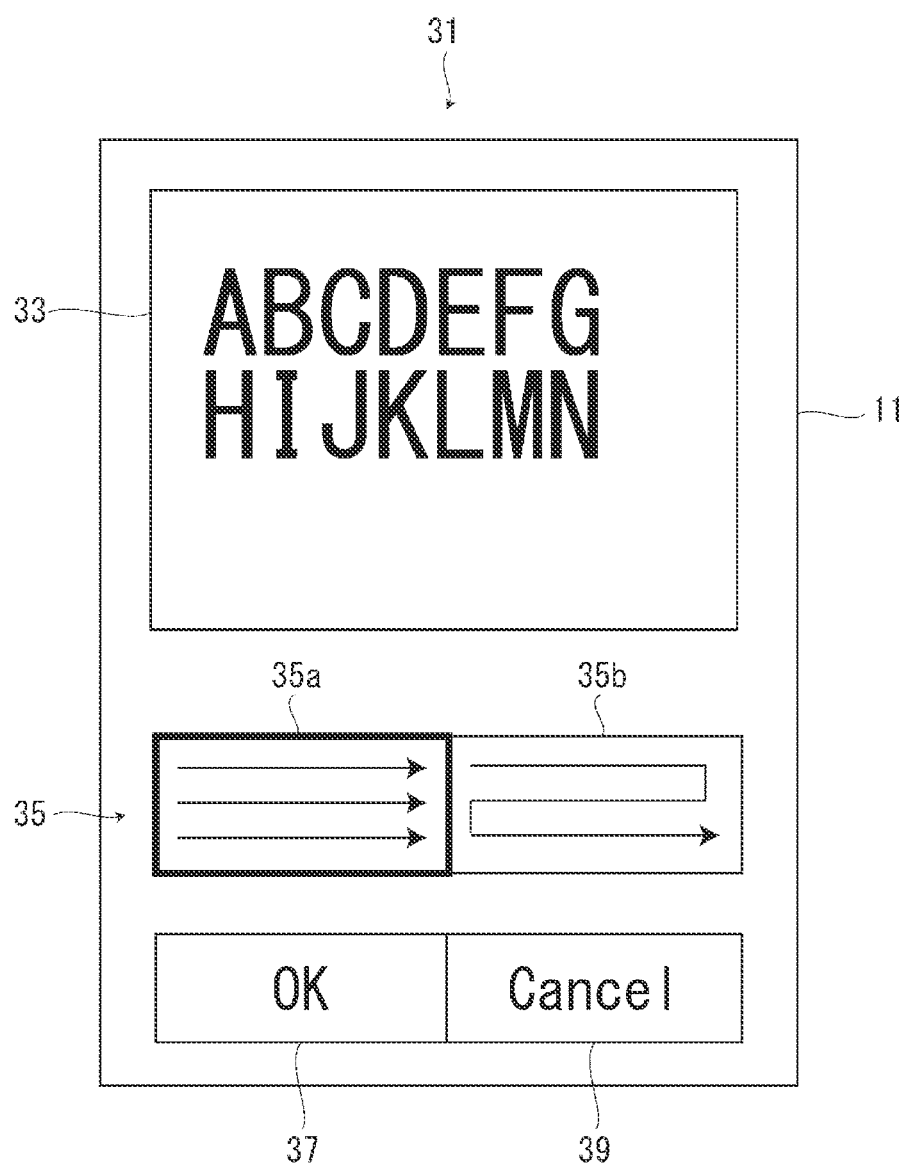
FIG. 8 shows a print setting screen.

As shown in FIG. 8, the print setting screen 31 is provided with a print preview 33, a movement direction selection section 35, a second OK button 37, and a second cancel button 39.

In the print preview 33, a preview of the print image 203 is displayed, based on information inputted to the information input section 25 of the print instruction screen 21. When the text option 23a is selected in the print type selection section 23 of the print instruction screen 21, as shown in FIG. 7, the information processing device 1 displays a text inputted to the information input section 25 of the print instruction screen 21 as a preview of the print image 203.

In the movement direction selection section 35, a one-direction print option 35a and a two-direction print option 35b are displayed in a selectable manner. When printing of the print image 203 can be executed in one path, only the one-direction print option 35a may be made selectable and the two-direction print option 35b may be made unselectable.

The second OK button 37 accepts an operation for confirming a selection on the print setting screen 31. When accepting an operation on the second OK button 37, the information processing device 1 generates print data and transmits a print job including the generated print data, information representing a print type, and information representing a designated direction, to the printing device 101. The second cancel button 39 accepts an operation for canceling a selection on the print setting screen 31. When accepting an operation on the second cancel button 39, the information processing device 1 resets the setting on the print setting screen 31 and displays the print instruction screen 21.

Figure 6:
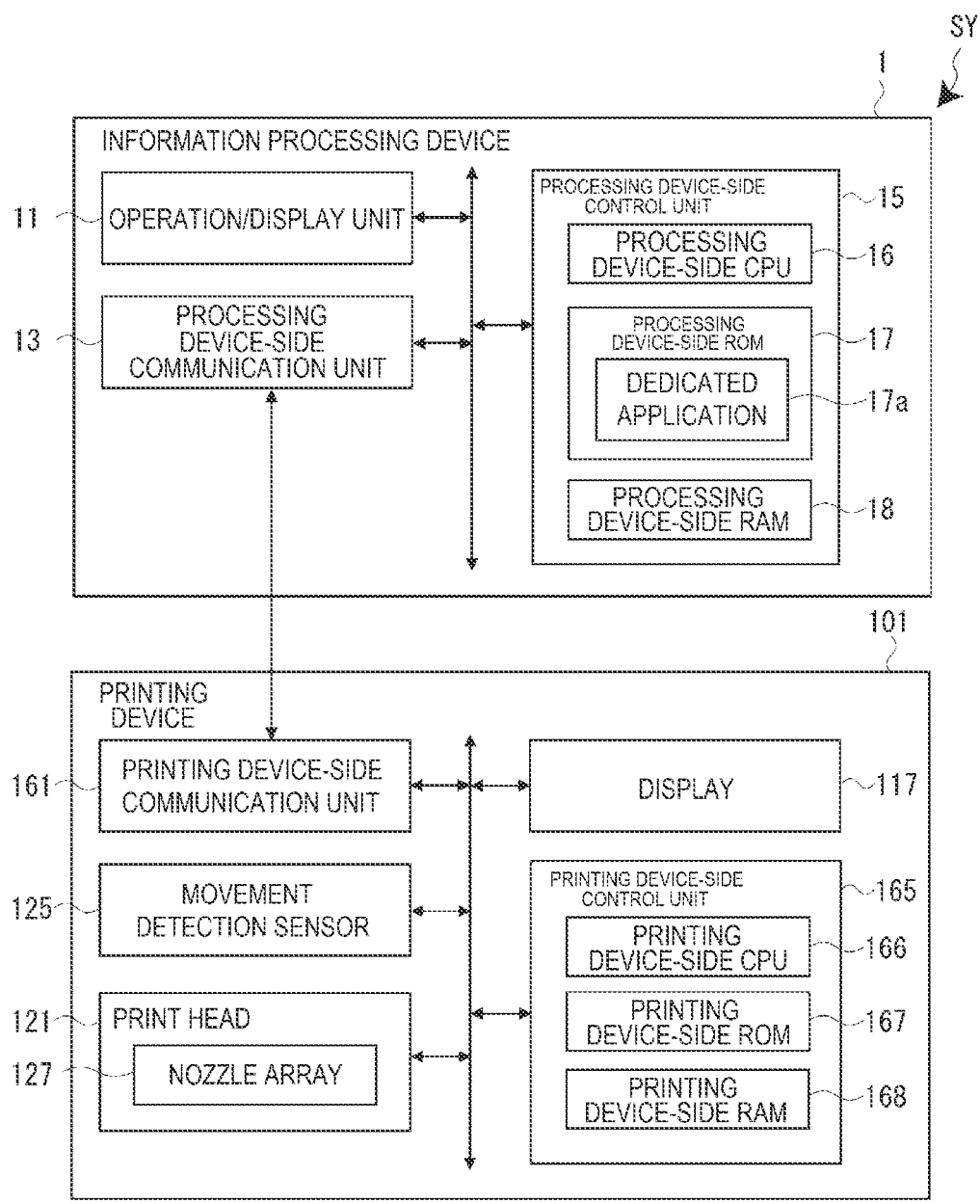
FIG. 6 is a control block diagram of the printing system.

Back to the explanation of FIG. 6, the processing device-side communication unit 13 communicates with the printing device 101 wirelessly or via other measures. For example, the processing device-side communication unit 13 transmits a print job to the printing device 101.

The processing device-side control unit 15 includes a processing device-side CPU (central processing unit) 16, a processing device-side ROM (read-only memory) 17, and a processing device-side RAM (random-access memory) 18.

The processing device-side CPU 16 loads various control programs stored in the processing device-side ROM 17 into the processing device-side RAM 18 and executes the control programs and thus performs various kinds of control. The processing device-side control unit 15 may use a hardware circuit such as an ASIC (application-specific integrated circuit), as a processor, instead of the processing device-side CPU 16. The processor may also be formed of one or more CPUs and a hardware circuit such as an ASIC cooperating with each other.

The processing device-side ROM 17 is a rewritable ROM such as a flash memory and stores various control programs and various control data. The processing device-side RAM 18 is used as a work area for the processing device-side CPU 16 to perform various kinds of control.

The processing device-side ROM 17 stores a dedicated application 17a for controlling the printing device 101. The processing device-side CPU 16 displays the print instruction screen 21 and the print setting screen 31, using the dedicated application 17*a*.

The processing device-side CPU 16 also generates a print job, using the dedicated application 17*a*. More specifically, the processing device-side CPU 16 generates a print job, based on the information inputted on the print instruction screen 21 and the setting on the print setting screen 31.

The printing device 101 has a printing device-side communication unit 161, the movement detection sensor 125, the print head 121, the display 117, and a printing device-side control unit 165.

The printing device-side communication unit 161 communicates with the information processing device 1 wirelessly or via other measures. The printing device-side communication unit 161 may be described as a communication circuit, communication interface, communication port or the like.

The movement detection sensor 125 optically scans very small recesses and protrusions on the medium 201 while the printing device 101 is moved in relation to the medium 201, and thus outputs a movement detection signal for detecting the amount of movement and the direction of movement of the printing device 101. The movement detection sensor 125 includes, for example, a light source that casts LED (light-emitting diode) light onto the medium 201, and a light receiving sensor that receives reflected light of the LED light from the medium 201 and outputs the movement detection signal.

The movement detection sensor 125 periodically outputs the movement detection signal until the printing device 101 stops or completes printing after the printing device 101 is given a print start instruction by an operation on the print button 115. However, when the distance between the printing device 101 and the medium 201 is longer than a distance L1, the movement detection sensor 125 cannot receive reflected light from the medium 201 and therefore does not output the movement detection signal.

The print head 121 has the nozzle array 127 including a plurality of nozzles that are arrayed. The print head 121 ejects ink from the plurality of nozzles and thus prints on the medium 201. The print head 121 may have a plurality of nozzle arrays 127. The printing device 101 may be provided with a plurality of print heads 121. In this case, the plurality of print heads 121 may be configured to eject ink of different colors from each other from the nozzles provided in each print head 121.

The display 117 displays the display image 303 corresponding to a printed part including the current printing position 311 (see FIG. 10) in the print image 203. The display 117 displays the display image 303 during the printing by the print head 121. The current printing position 311 is not limited to a precise position. For example, in the case of printing a text, one letter that is currently being printed may be used as the current printing position 311.

The printing device-side control unit 165 includes a printing device-side CPU 166, a printing device-side ROM 167, and a printing device-side RAM 168.

The printing device-side CPU 166 loads various control programs stored in the printing device-side ROM 167 into the printing device-side RAM 168 and executes the control programs and thus performs various kinds of control. The printing device-side control unit 165 may use a hardware circuit such as an ASIC (application-specific integrated circuit), as a processor, instead of the printing device-side CPU 166. The processor may also be formed of one or more CPUs and a hardware circuit such as an ASIC cooperating with each other.

The printing device-side ROM 167 stores various control programs and various control data. The printing device-side RAM 168 is used as a work area for the printing device-side CPU 166 to perform various kinds of control.

The printing device-side CPU 166 detects an amount of movement of the printing device 101 in the X-direction and the Y-direction, based on a movement detection signal outputted from the movement detection sensor 125. The printing device-side CPU 166 calculates a distance moved by the printing device 101 in the X-direction and the Y-direction, based on the detected amount of movement in the X-direction and the Y-direction, and detects the direction of movement of the printing device 101 and performs drive control for the print head 121, based on the calculated distance moved. More specifically, the printing device-side CPU 166 causes the print head 121 to eject ink from each nozzle at a timing based on the calculated distance moved. Thus, the printing device 101 can properly print the print image 203 on the medium 201, regardless of the speed at which the user 301 moves the printing device 101.

The printing device-side CPU 166 also performs display control for the display 117 synchronously with the drive control for the print head 121. More specifically, with the movement of the printing device 101, the printing device-side CPU 166 causes the display 117 to display the display image 303 changing with the printing of the print image 203 as if the print image 203 printed on the medium 201 appears as a see-through image on the display 117. When a movement detection signal is not outputted from the movement detection sensor 125, the printing device-side CPU 166 determines that the printing device 101 is moved away from the medium 201. Therefore, the printing device 101 stops printing and hides the display image 303.

Figure 9:
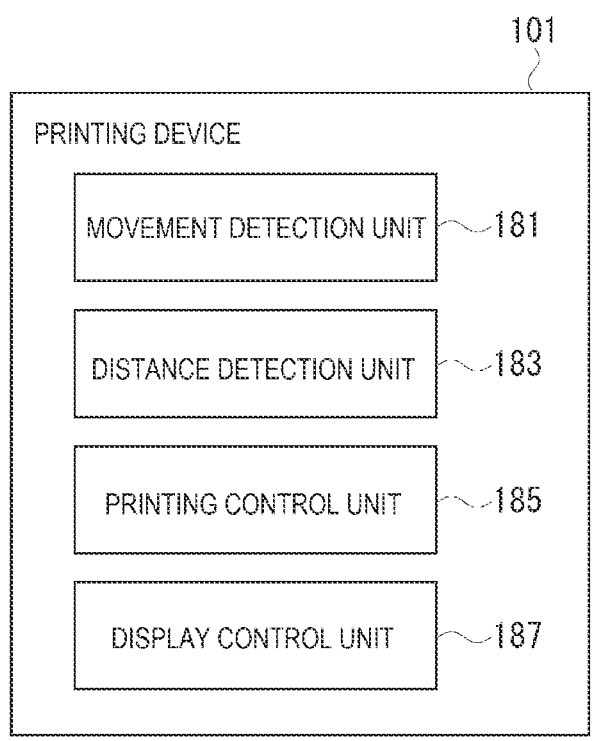
FIG. 9 is a functional block diagram of the printing device.

The functional configuration of the printing device 101 will now be described with reference to FIG. 9. The printing device 101 has a movement detection unit 181, a distance detection unit 183, a printing control unit 185, and a display control unit 187. Each of these functions is implemented by the printing device-side CPU 166 executing a control program stored in the printing device-side ROM 167. The printing control unit 185 and the display control unit 187 are an example of a "control unit".

The movement detection unit 181 detects an amount of movement of the printing device 101 in relation to the medium 201, based on a movement detection signal outputted from the movement detection sensor 125. The movement detection unit 181 detects an amount of movement of the printing device 101 in the X-direction and the Y-direction, as the amount of movement of the printing device 101.

The distance detection unit 183 detects a distance from the medium 201, using the movement detection sensor 125. More specifically, when a movement detection signal is outputted from the movement detection sensor 125, the distance detection unit 183 detects that the distance between the printing device 101 and the medium 201 is equal to or shorter than the distance L1. When a movement detection signal is not outputted from the movement detection sensor 125, the distance detection unit 183 detects that the distance between the printing device 101 and the medium 201 is longer than the distance L1.

The printing control unit 185 causes the print head 121 to print the print image 203 according to the amount of movement of the printing device 101 detected by the movement detection unit 181.

The display control unit 187 causes the display 117 to display the display image 303 corresponding to the print image 203 printed by the print head 121, according to the amount of movement of the printing device 101 detected by the movement detection unit 181. The display control unit 187 generates display data for causing the display 117 to display the display image 303, using print data included in a print job transmitted from the information processing device 1. The display control unit 187 causes the display 117 to display an image showing the current printing position 311 in the print image 203, as the display image 303. This enables the user 301 to grasp the current printing position 311 in the print image 203 and therefore reduce a wrong operation due to being unable to grasp the current printing position 311 in the print image 203. The current printing position 311 in the print image 203 refers to the current printing position 311 in the print image 203 in the X-direction and the Y-direction.

The display control unit 187 causes the display 117 to display an image corresponding to a printed part including the current printing position 311, of the print image 203, as the display image 303. In other words, the display control unit 187 does not cause the display 117 to display an image corresponding to a part yet to be printed, of the print image 203, as the display image 303.

The display control unit 187 causes the display 117 to display the display image 303 in such a way that the position in the display image 303 corresponding to the current printing position 311 in the print image 203 coincides with a specified position on the display 117. In this embodiment, the specified position is substantially the center of the display 117. Also, the specified position is a position indicated by the plurality of marks M (see FIG. 4) provided around the display 117. That is, of the four first marks M1 provided in the −X-direction and the +X-direction in relation to the display 117, the two first marks M1 provided in the −X-direction or the two first marks M1 provided in the +X-direction in relation to the display 117 indicate the specified position in the Y-direction. Also, the two second marks M2 provided in the +Y-direction and the −Y-direction in relation to the display 117 indicate the specified position in the X-direction.

The display control unit 187 changes the display image 303 according to the distance detected by the distance detection unit 183. The display control unit 187 in this embodiment displays the display image 303 when the distance detected by the distance detection unit 183 is equal to or shorter than the distance L1. The display control unit 187 hides the display image 303 when the distance detected by the distance detection unit 183 is longer than the distance L1. This enables the user 301 to immediately notice that the printing device 101 is away from the medium 201.

Specific display control by the display control unit 187 will now be described with reference to FIGS. 10 to 14. Display control when the printing device 101 prints the print image 203 based on the print preview 33 and the result of selection in the movement direction selection section 35 on the print setting screen 31 shown in FIG. 8 is described. That is, the print image 203 to be printed by the printing device 101 is a print image 203 including two lines of letter strings, that is, a letter string "ABCDEFG" and a letter string "HIJKLMN". Each line is printed in order from the first letter with the movement of the printing device 101 in the +X-direction. In the description below, it is assumed that the printing device 101 prints one line of letter string in one path.

Figure 10:
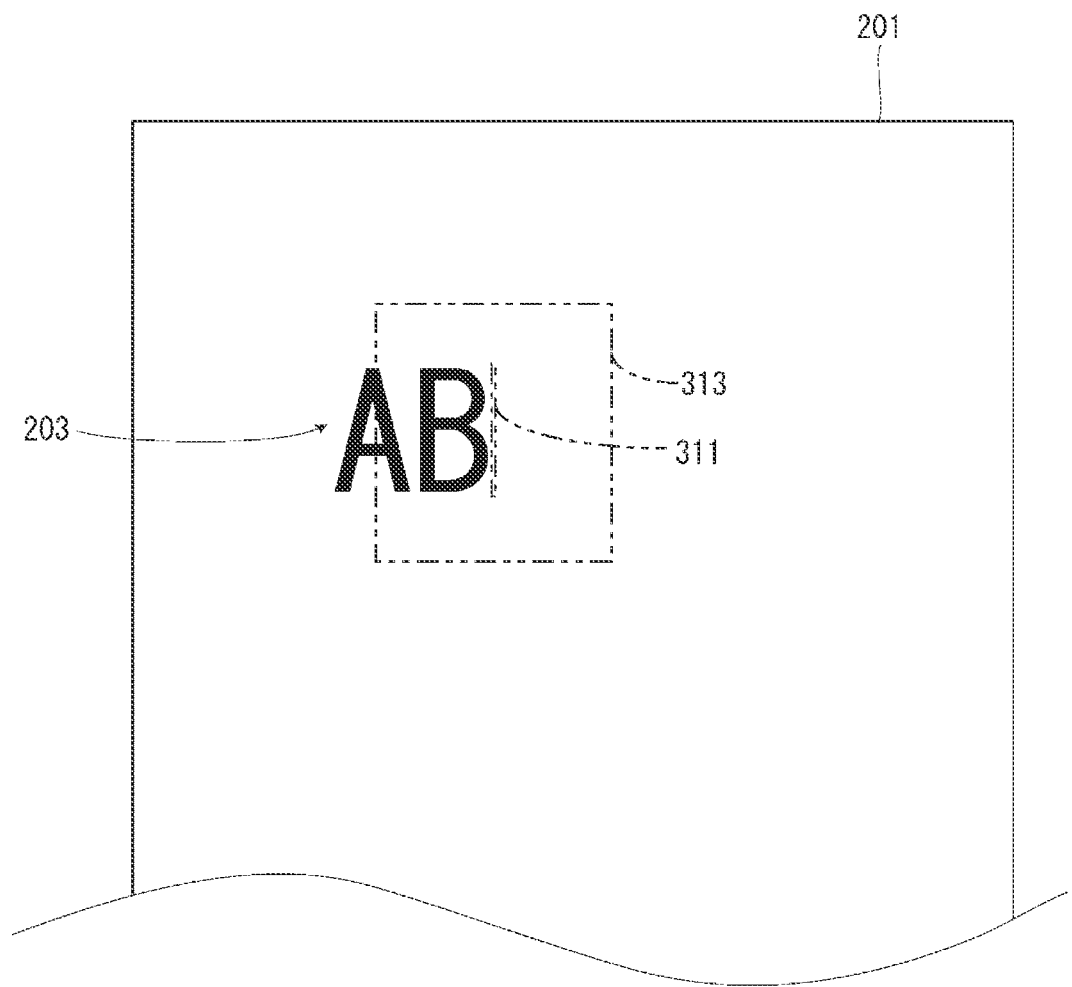
FIG. 10 shows a state where printing of a letter "B" that is a part of a print image on a medium is finished.
Figure 10:
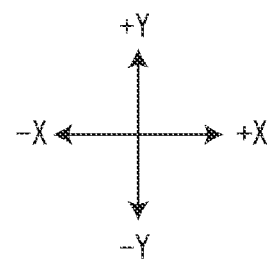

FIG. 10 shows the state where the printing device 101 has finished printing the letter "B", which is a part of the print image 203, on the medium 201. In the state shown in FIG. 10, the current printing position 311 in the print image 203 is located in the +X-direction in relation to the letter "B". A specified area with the current printing position 311 at its center is a display target area 313 displayed on the display 117.

Figure 11:
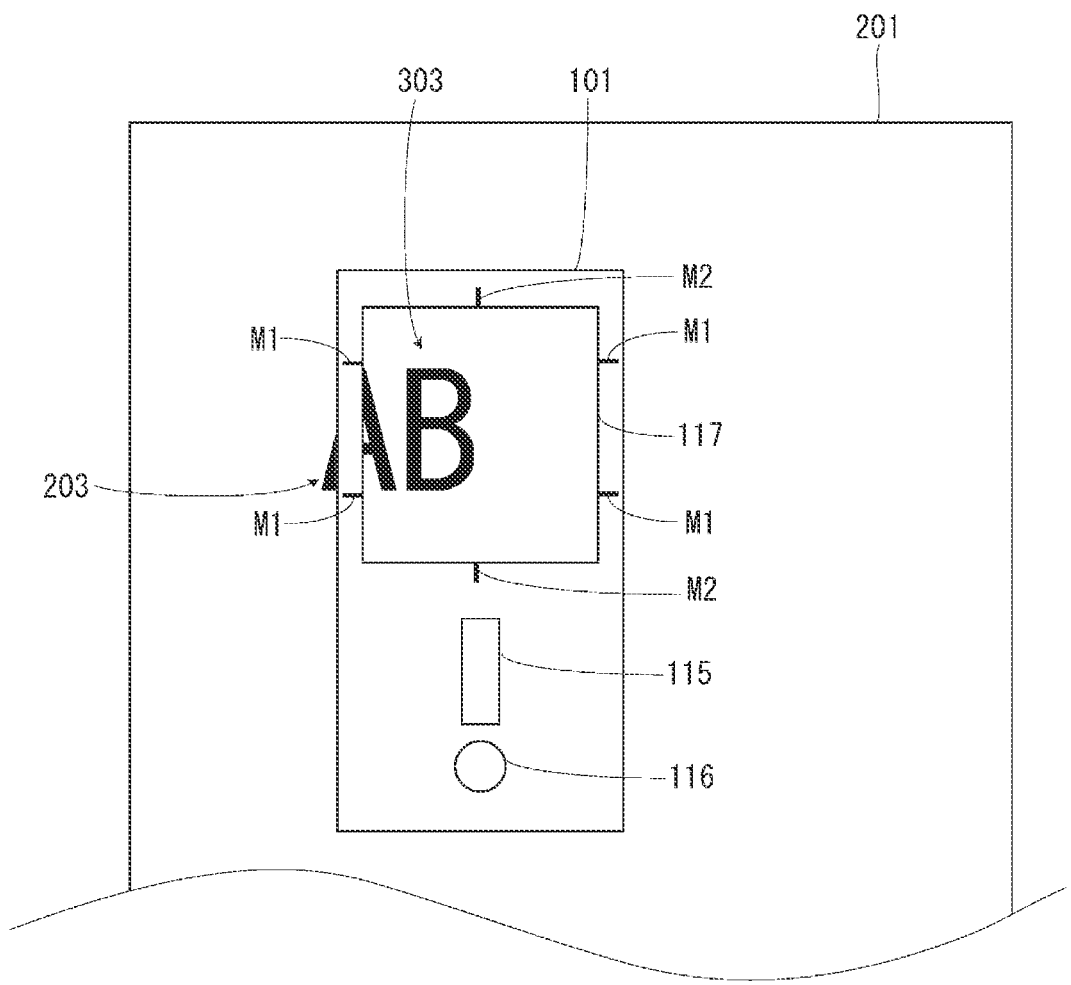
FIG. 11 shows a display image displayed on a display in the state shown in FIG. 10.
Figure 11:
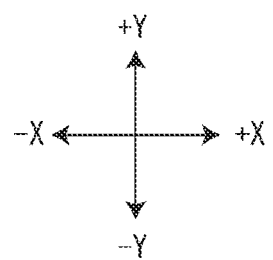

FIG. 11 shows the display image 303 displayed on the display 117 in the state shown in FIG. 10, that is, in the state where the printing of the letter "B" on the medium 201 is finished. In this case, the printing device 101 causes the display 117 to display an image corresponding to the display target area 313 with the current printing position 311 at its center, of the print image 203 shown in FIG. 10, as the display image 303. The printing device 101 also causes the display 117 to display the display image 303 in such a way that the position in the display image 303 corresponding to the current printing position 311 in the print image 203 coincides with the specified position on the display 117, that is, the position indicated by the plurality of marks M. The position indicated by the plurality of marks M refers to a range on a line connecting the two second marks M2 and from a position intersecting a line connecting the two first marks M1 located in the +Y-direction, of the four first marks M1, to a position intersecting a line connecting the two first marks M1 located in the −Y-direction. The printing device 101 causes the display 117 to display the display image 303 in substantially the same size as the print image 203.

Figure 12:
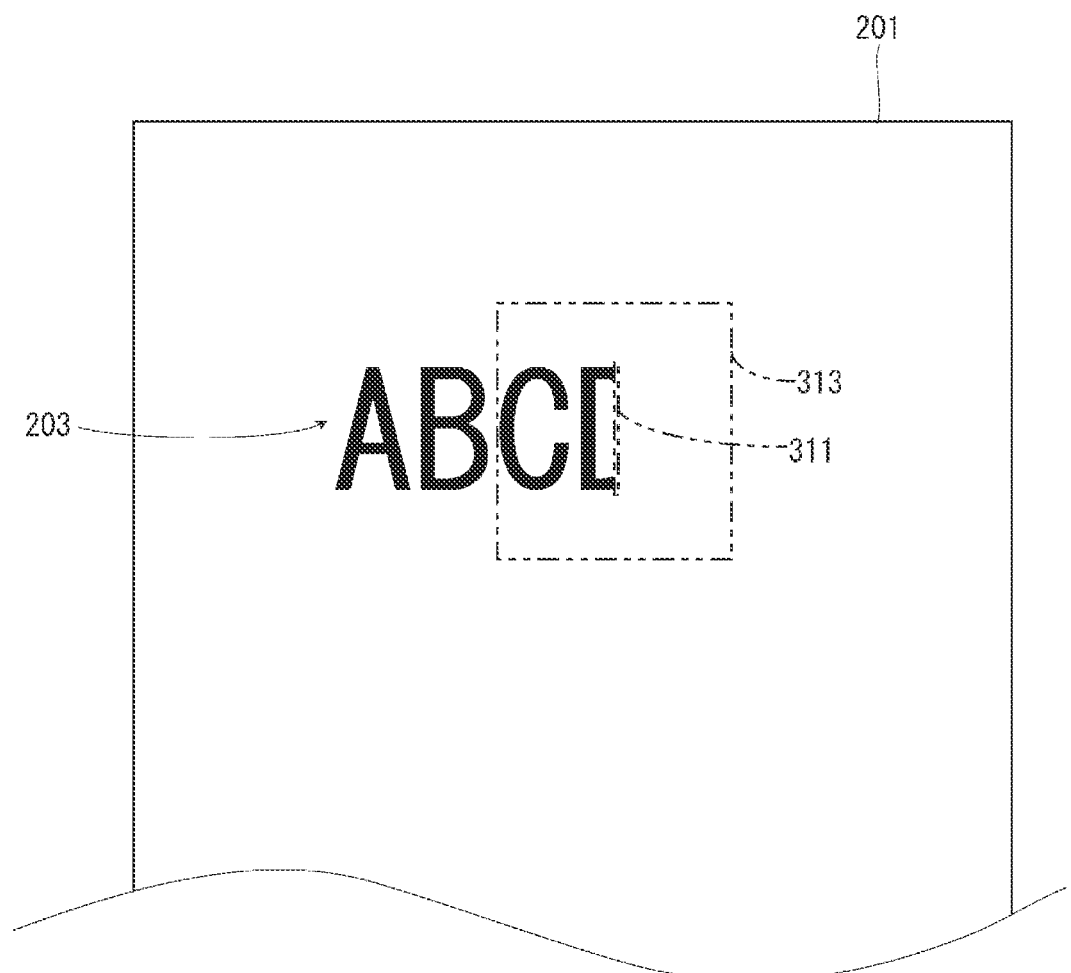
FIG. 12 shows a state where a letter "D" that is a part of a print image is being printed on a medium.
Figure 12:
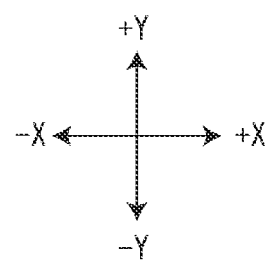

FIG. 12 shows the state where the printing device 101 is printing the letter "D", which is a part of the print image 203, on the medium 201. In the state shown in FIG. 12, the current printing position 311 in the print image 203 is located at a halfway point of printing the letter "D". A specified area with the current printing position 311 at its center is the display target area 313 displayed on the display 117.

Figure 13:
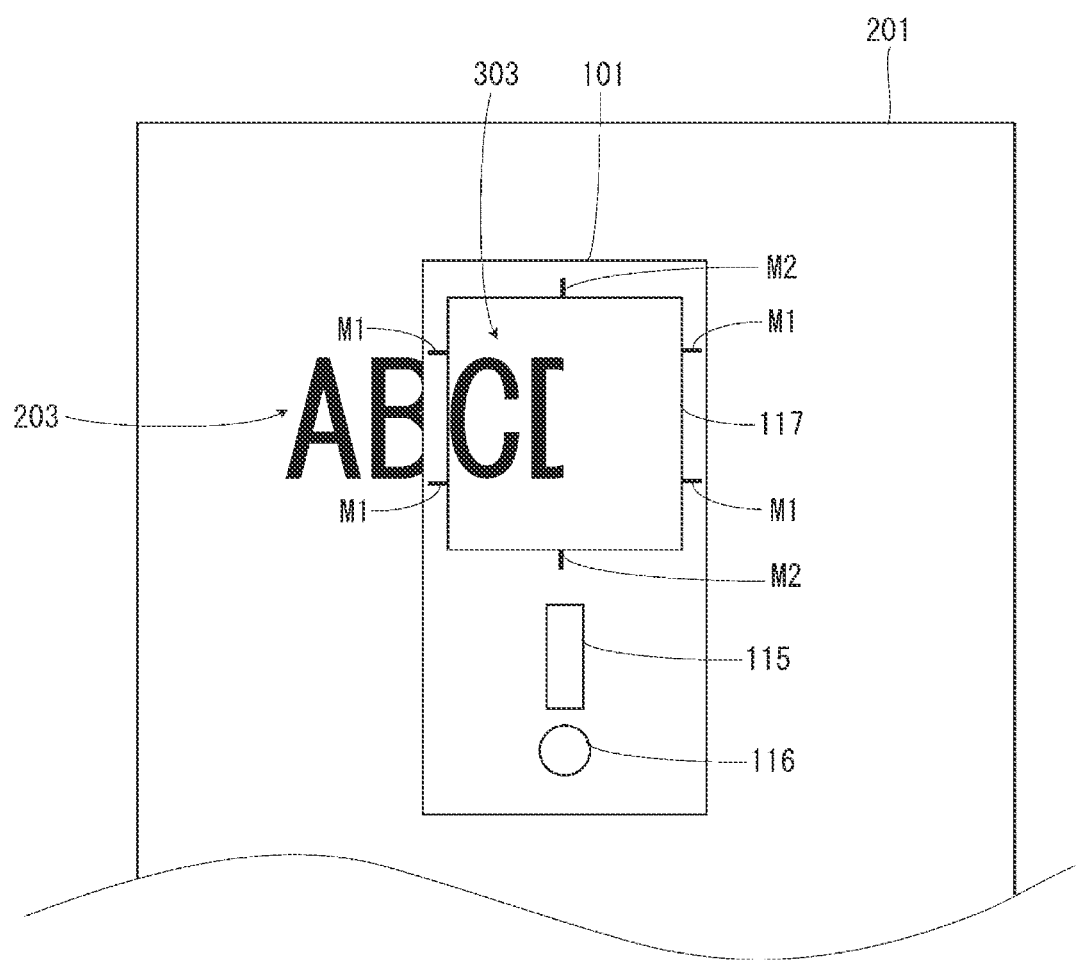
FIG. 13 shows a display image displayed on the display in the state shown in FIG. 12.

FIG. 13 shows the display image 303 displayed on the display 117 in the state shown in FIG. 12, that is, in the state where the letter "D" is being printed on the medium 201. The printing device 101 causes the display 117 to display an image corresponding to the display target area 313 with the current printing position 311 at its center, of the print image 203 shown in FIG. 12, as the display image 303. The printing device 101 causes the display 117 to display the display image 303 in such a way that the position in the display image 303 corresponding to the current printing position 311 in the print image 203 coincides with the specified position on the display 117 indicated by the plurality of marks M.

Figure 14:
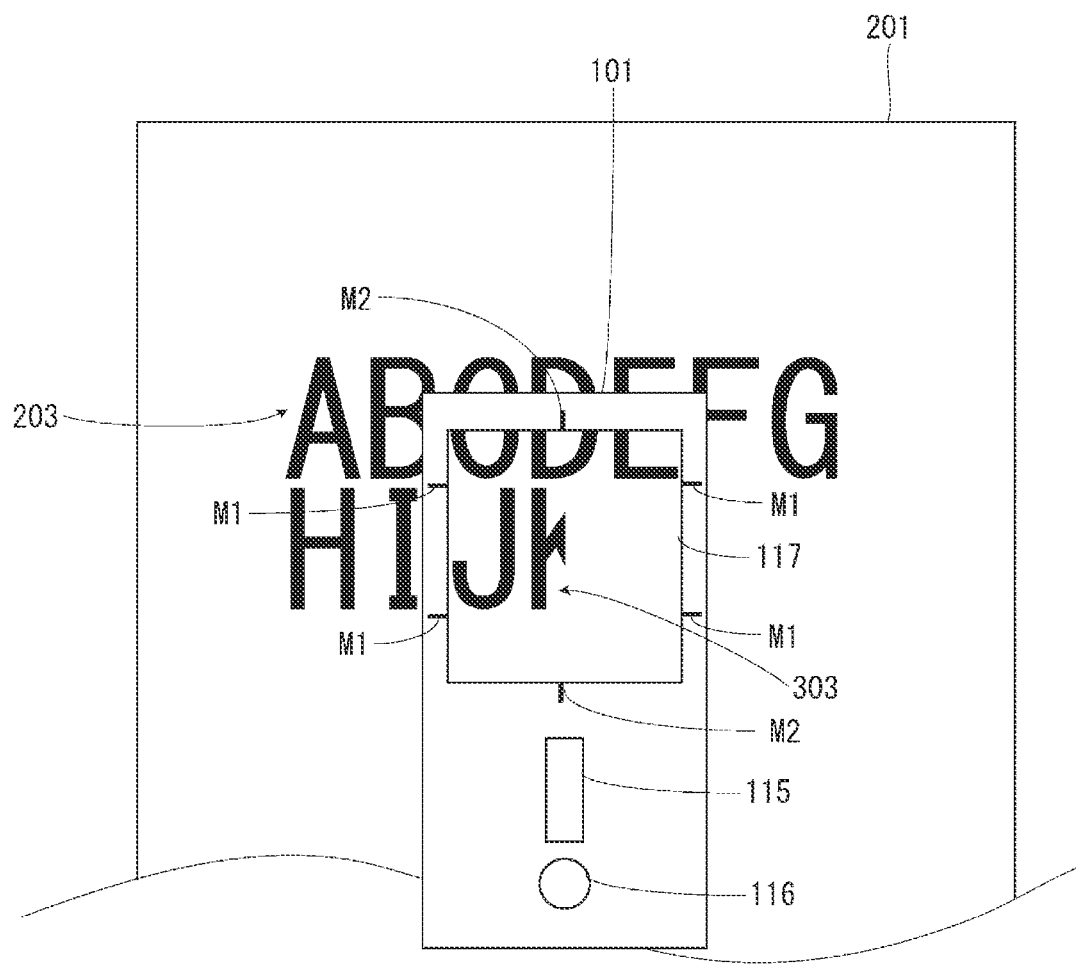
FIG. 14 shows a display image displayed on the display in a state where a letter string in the second line is being printed on a medium.

FIG. 14 shows the display image 303 displayed on the display 117 in the state where the second line of letter string "HIJKLMN", of the two lines of letter strings included in the print image 203, is being printed on the medium 201. In this case, too, the printing device 101 causes the display 117 to display an image corresponding to a specific area with the current printing position 311 at its center, of the printed part of the print image 203, as the display image 303. In this way, the printing device 101 causes the display 117 to display an image included in the display target area 313 with the current printing position 311 in the print image 203 at its center, as a part of the display image 303, whether it is a line that is being printed or a line that is already printed.

Figure 15:
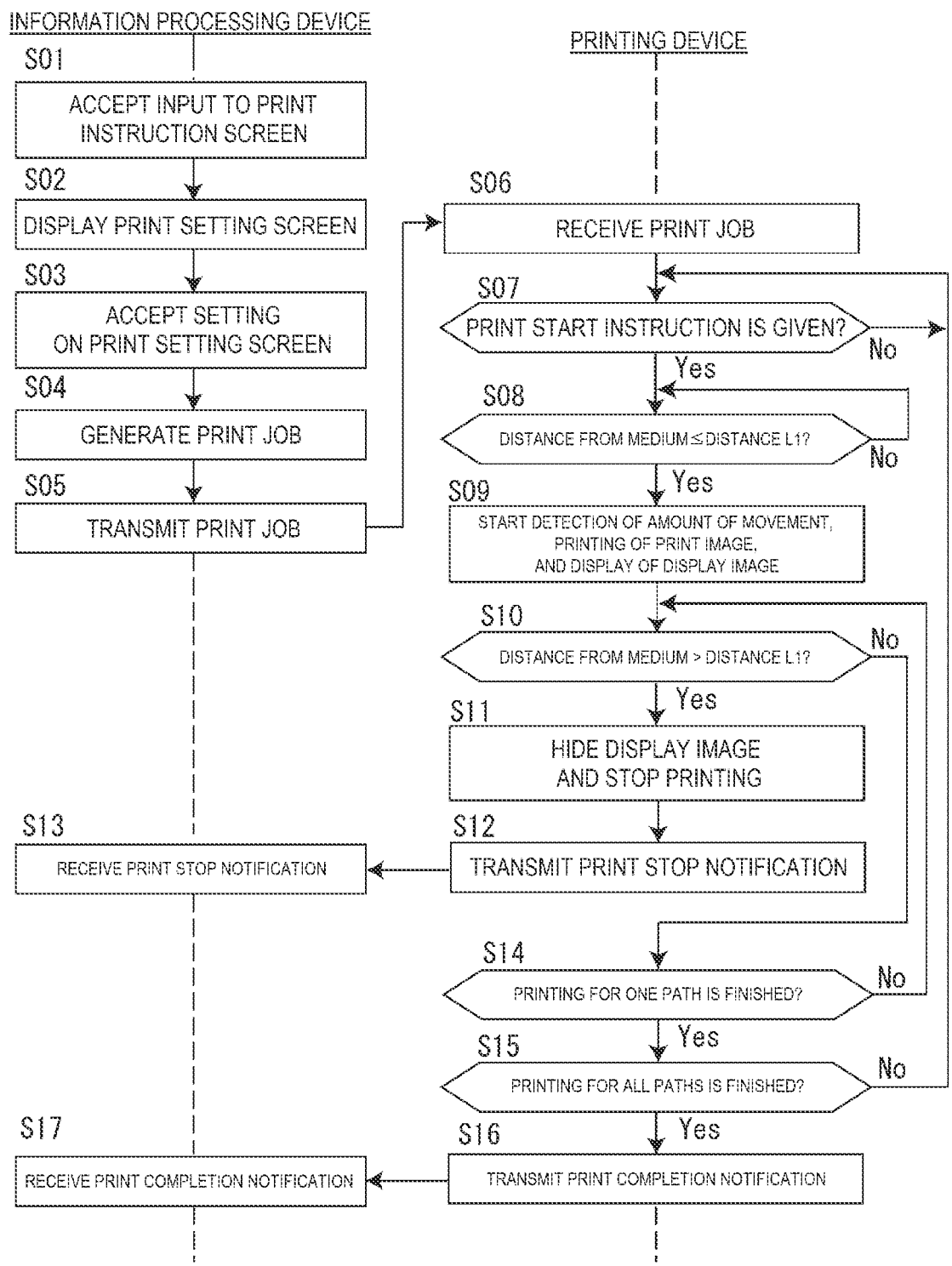
FIG. 15 is a flowchart showing printing control processing executed by an information processing device and printing processing executed by the printing device.

Printing control processing executed by the information processing device 1 and printing processing executed by the printing device 101 will now be described with reference to FIG. 15. It is assumed that the information processing device 1 has started the dedicated application 17a and has displayed the print instruction screen 21 on the operation/display unit 11.

In step S01, the information processing device 1 accepts an input to the print instruction screen 21. The information processing device 1 accepts a selection of a print type and an input of information corresponding to the selected print type on the print instruction screen 21.

In step S02, the information processing device 1 displays the print setting screen 31 on the operation/display unit 11.

In step S03, the information processing device 1 accepts a setting on the print setting screen 31. The information processing device 1 accepts a selection of a direction of movement on the print setting screen 31.

In step S04, the information processing device 1 generates a print job, based on the information inputted to the print instruction screen 21 and the setting on the print setting screen 31.

In step S05, the information processing device 1 transmits the print job generated in step S04 to the printing device 101.

In step S06, the printing device 101 receives the print job transmitted from the information processing device 1.

In step S07, the printing device 101 determines whether a print start instruction is given or not. When a short press on the print button 115 is given, the printing device 101 determines that a print start instruction is given. When determining that a print start instruction is given, the printing device 101 proceeds to step S08. When determining that a print start instruction is not given, the printing device 101 repeats step S07.

In step S08, the printing device 101 determines whether the distance from the medium 201 is equal to or shorter than the distance L1 or not. When a movement detection signal is outputted from the movement detection sensor 125, the printing device 101 determines that the distance from the medium 201 is equal to or shorter than the distance L1. When a movement detection signal is not outputted from the movement detection sensor 125, the printing device 101 determines that the distance from the medium 201 is not equal to or shorter than the distance L1. When determining that the distance from the medium 201 is equal to or shorter than the distance L1, the printing device 101 proceeds to step S09. When determining that the distance from the medium 201 is not equal to or shorter than the distance L1, the printing device 101 repeats step S08.

In step S09, the printing device 101 starts detection of an amount of movement of the printing device 101, printing of the print image 203, and display of the display image 303. The printing device 101 detects the amount of movement of the printing device 101, based on the movement detection signal outputted from the movement detection sensor 125. The printing device 101 also performs drive control for a head driver, not illustrated, that drives the print head 121, and thus prints the print image 203. The printing device 101 also performs drive control for a display driver, not illustrated, that drives the display 117, and thus displays the display image 303.

In step S10, the printing device 101 determines whether the distance from the medium 201 is longer than the distance L1 or not. When a movement detection signal is not outputted from the movement detection sensor 125, the printing device 101 determines that the distance from the medium 201 is longer than the distance L1. When a movement detection signal is outputted from the movement detection sensor 125, the printing device 101 determines that the distance from the medium 201 is not longer than the distance L1. When determining that the distance from the medium 201 is longer than the distance L1, the printing device 101 proceeds to step S11. When determining that the distance from the medium 201 is not longer than the distance L1, the printing device 101 proceeds to step S14.

In step S11, the printing device 101 hides the display image 303 displayed on the display 117 (see FIG. 17) and stops the printing. At this time, the printing device 101 also stops the detection of the amount of movement.

In step S12, the printing device 101 transmits a print stop notification to the effect that the printing is stopped, to the information processing device 1.

In step S13, the information processing device 1 receives the print stop notification transmitted from the printing device 101.

In step S14, the printing device 101 determines whether printing for one path is finished or not. When determining that printing for one path is finished, the printing device 101 proceeds to step S15. When determining that printing for one path is not finished, the printing device 101 returns to step S10.

In step S15, the printing device 101 determines whether printing for all the paths is finished or not. When determining that printing for all the paths is finished, the printing device 101 proceeds to step S16. When determining that printing for all the path is not finished, the printing device 101 returns to step S07. When determining that printing for all the paths is finished, the printing device 101 also finishes the detection of the amount of movement of the printing device 101 and the display of the display image 303.

In step S16, the printing device 101 transmits a print completion notification to the effect that the printing is completed, to the information processing device 1.

In step S17, the information processing device 1 receives the print completion notification transmitted from the printing device 101.

As described above, in the printing device 101 in this embodiment, the print head 121 is provided at the second outer surface 105, which is the bottom surface of the printing device 101. Therefore, the user 301 cannot view the current printing position 311 in the print image 203. However, the display image 303 corresponding to a printed part of the print image 203 is displayed on the display 117, thus enabling the user 301 to grasp the current printing position 311 in the print image 203. Therefore, the user 301 can reduce a wrong operation due to being unable to grasp the current printing position 311 in the print image 203. The wrong operation due to being unable to grasp the current printing position 311 in the print image 203 is, for example, an operation such as interrupting the operation of moving the printing device 101 in the +X-direction or the −X-direction before printing in a path is finished, or in the case of printing in a plurality of paths, moving the printing device 101 away from the medium 201 before printing in all the paths is finished.

The printing device 101 displays, as the display image 303, an image corresponding to a printed part including the current printing position 311, of the print image 203, and displays the display image 303 in such a way that the position in the display image 303 corresponding to the current printing position 311 in the print image 203 coincides with the specified position on the display 117. Thus, the user 301 can check, as the display image 303, a video image that looks as if the print image 203 is picked up from the moving printing device 101 while the printing device 101 is moved.

The printing device 101 hides the display image 303 when the distance from the medium 201 is longer than the distance L1. Thus, the user 301 can intuitively grasp that printing is stopped, even when the user 301 does not notice that the distance from the medium 201 has become longer than the distance L1 while moving the printing device 101 when the surface of the medium 201 is uneven or where the medium 201 has a curved surface or the like.

When the printing device 101 is moved in the state of being away from the medium 201, an ink mist of ink ejected from the nozzle of the print head 121 may adhere to the second outer surface 105 and stain the medium 201. Therefore, hiding the display image 303 when the distance from the medium 201 is longer than the distance L1 and notifying the user 301 that the printing device 101 is moved away from the medium 201 is an effective measure in view of preventing the stain on the medium 201.

The printing device 101 displays the display image 303 in substantially the same size as the print image 203, on the display 117 provided in the +Z-direction in relation to the print head 121. Therefore, the user 301 can check the display image 303 on the display 117 as if viewing the print image 203 through the printing device 101.

The foregoing embodiment is not limiting. Modification examples described below can also be employed.

Modification Example 1

The printing device 101 in the embodiment determines whether the distance from the medium 201 is equal to or shorter than the distance L1 or not, based on whether a movement detection signal is outputted from the movement detection sensor 125 or not. However, a distance detection sensor detecting the distance from the medium 201 may be provided, and the distance from the medium 201 may be detected using the distance detection sensor. As the distance detection sensor, a laser sensor, ultrasonic sensor or the like can be used.

Modification Example 2

The printing device 101 in the embodiment causes the display 117 to display the display image 303 when determining that the distance from the medium 201 is equal to or shorter than the distance L1, and does not cause the display 117 to display the display image 303 when determining that the distance from the medium 201 is longer than the distance L1. However, the printing device 101 may change the display image 303 further in multiple stages according to the distance from the medium 201. For example, the printing device 101 may gradually hide the display image 303 as the distance from the medium 201 becomes longer.

Figure 16:
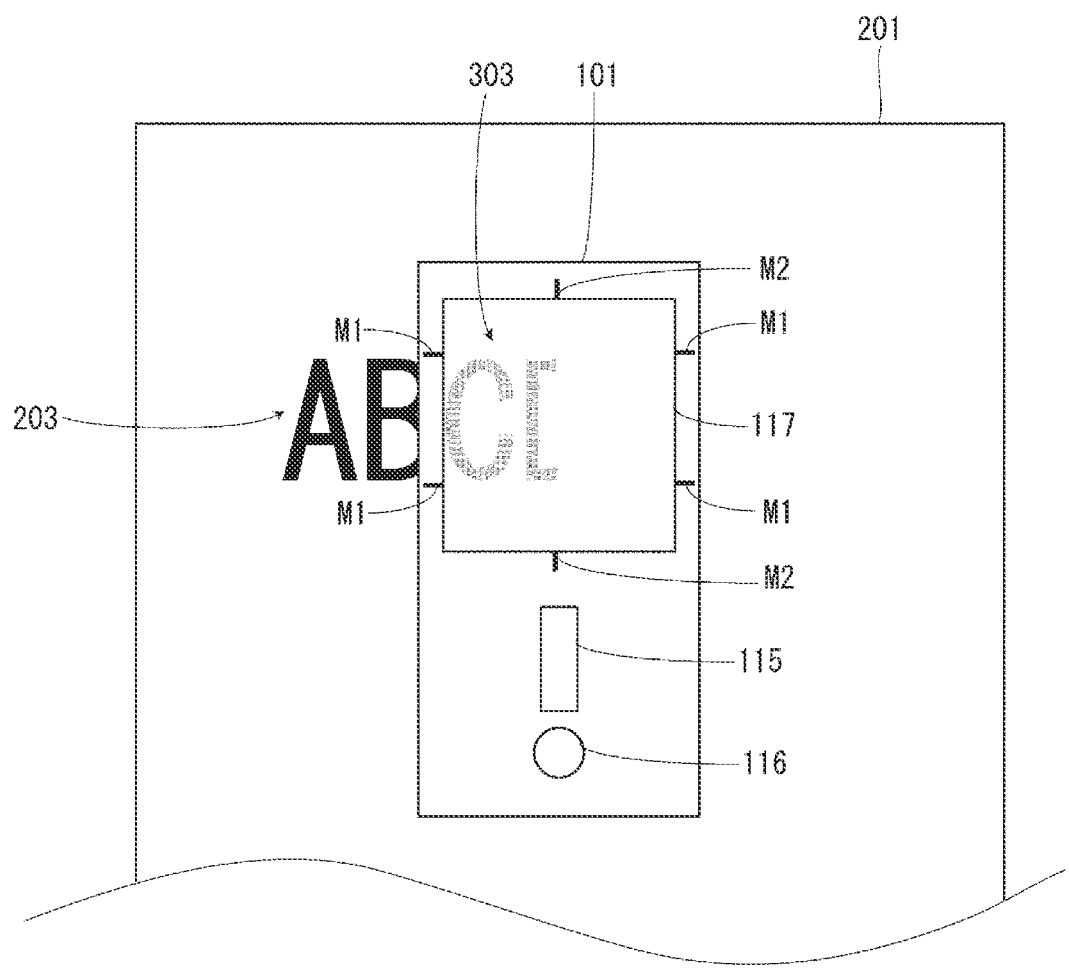
FIG. 16 is an explanatory view of Modification Example 2.
Figure 17:
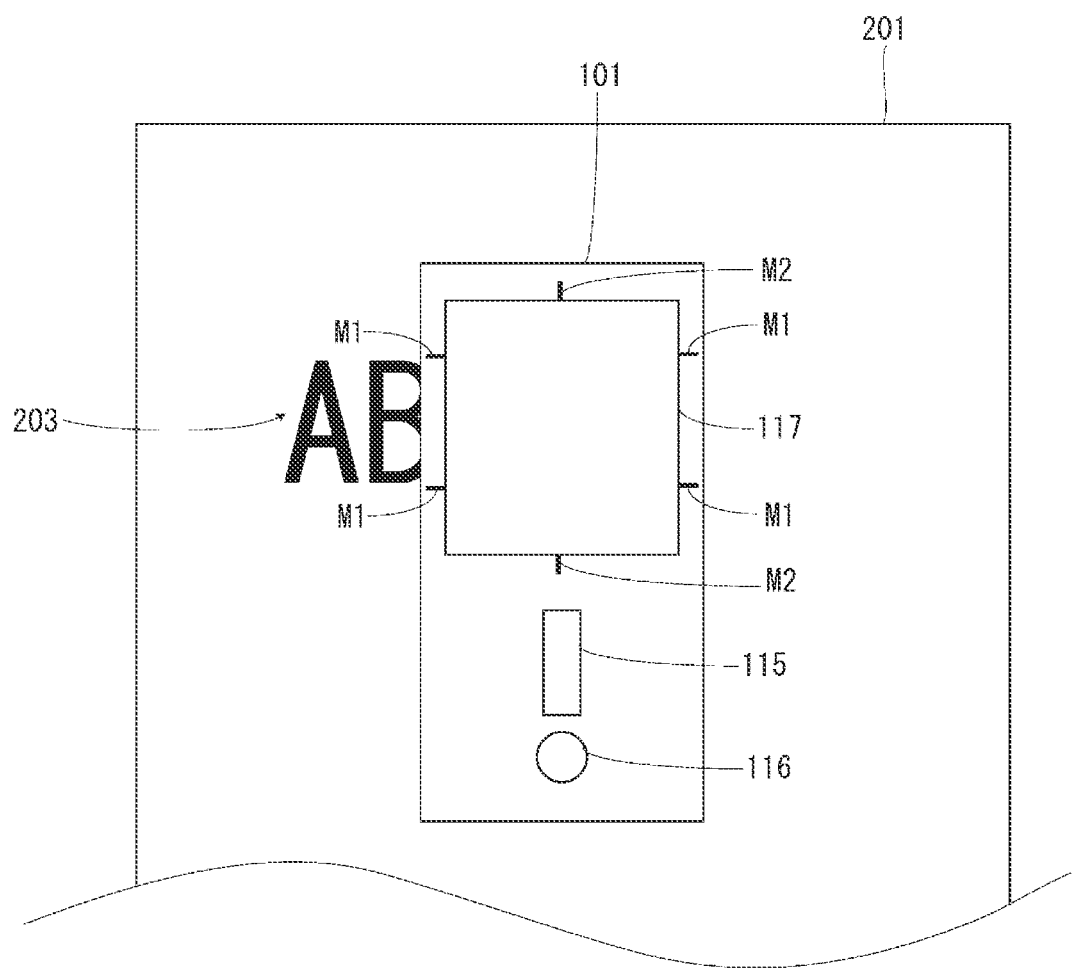
FIG. 17 is an explanatory view of Modification Example 2, continued from FIG. 16.

For example, it is now assumed that the display image 303 shown in FIG. 13 is displayed on the display 117 when the distance between the printing device 101 and the medium 201 is "0" and that the distance between the printing device 101 and the medium 201 is gradually increased from this state. FIG. 16 shows the display image 303 displayed when the distance between the printing device 101 and the medium 201 is a distance L2, where 0<L2<L1. In this case, the printing device 101 displays the display image 303 in a lighter color than when the distance between the printing device 101 and the medium 201 is "0" (see FIG. 13). FIG. 17 shows the display image 303 displayed when the distance between the printing device 101 and the medium 201 is longer than the distance L1. In this case, the printing device 101 hides the display image 303. In this way, according to this modification example, the user 301 can grasp the distance between the printing device 101 and the medium 201, based on the change in the display image 303 being gradually hidden. The printing device 101 may change the display image 303 in four or more stages instead of three stages as described in this example.

In another modification example, the printing device 101 may change various display forms of the display image 303, such as changing the color of the display image 303 except for the depth of color or changing the size of the display image 303, according to the distance from the medium 201.

Modification Example 3

Figure 18:
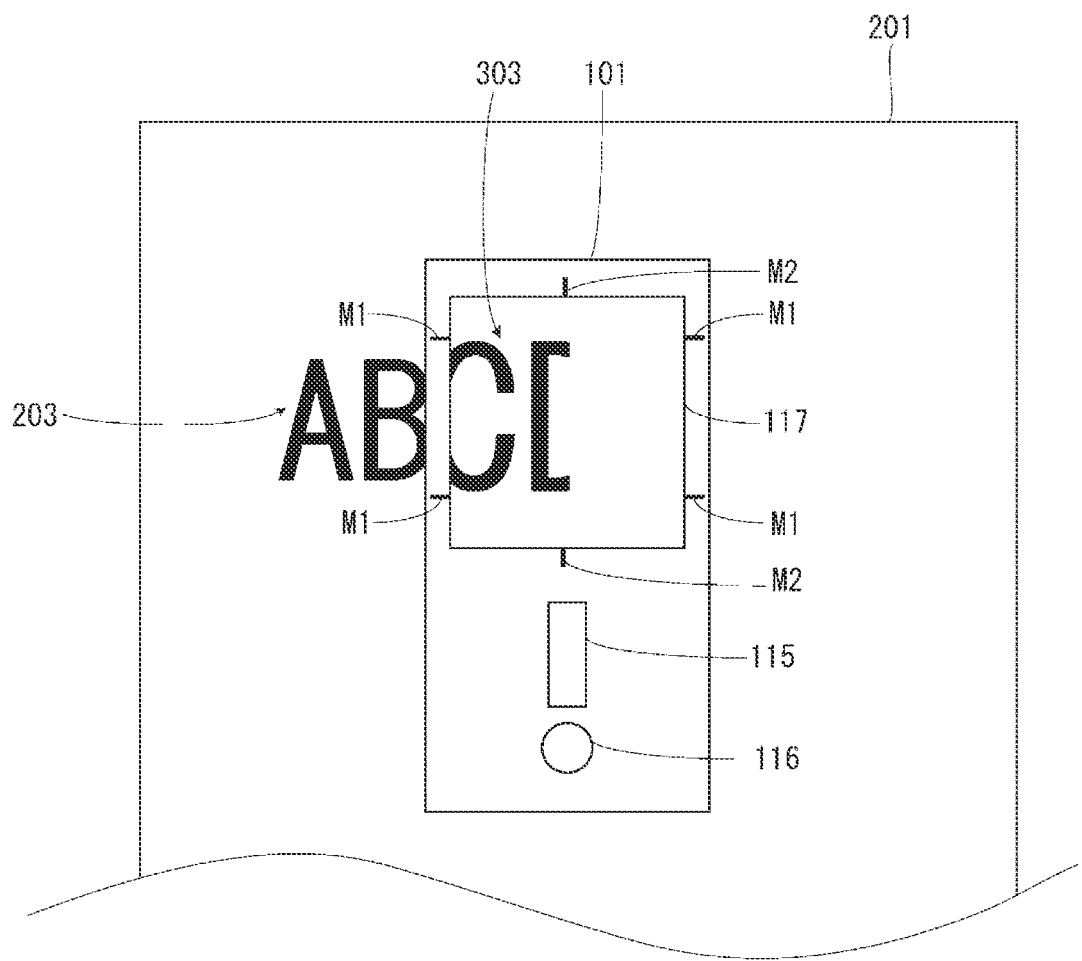
FIG. 18 is an explanatory view of Modification Example 3.
Figure 18:
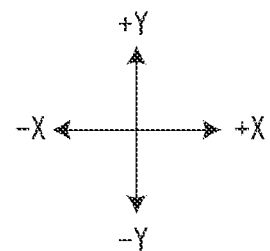

The printing device 101 in the embodiment displays the display image 303 in substantially the same size as the print image 203. However, the printing device 101 may display the display image 303 in a larger size than the print image 203. For example, when the printing device 101 is currently printing the letter "D" of the letter string "ABCDEFG" as shown in FIG. 13, the printing device 101 in this modification example causes the display 117 to display the display image 303 shown in FIG. 18. All the letters in the letter string "ABCDEFG" included in the print image 203 are the same size. As shown in FIG. 18, the printing device 101 displays the display image 303 in a larger font size than the font size of the print image 203. In this way, according to this modification example, the user 301 can check the display image 303 more in detail than when the display image 303 is displayed in the same size as the print image 203.

Due to the display image 303 displayed in a larger font size than the font size of the print image 203, the printing device 101 in this modification example differs from the printing device 101 in the embodiment (see FIG. 13) in the arrangement of the four first marks M1 provided on the −X-side and the +X-side of the display 117, of the plurality of marks M provided around the display 117. As described above, the four first marks M1 indicate the specified position in the Y-direction of the display 117 and correspond to the printable range P of the print head 121. Therefore, in the printing device 101 in this modification example, the space between the two first marks M1 provided on the −X-side of the display 117 and the two first marks M1 provided on the +X-side of the display 117 is broader than in the printing device 101 shown in FIG. 13.

Modification Example 4

Figure 19:
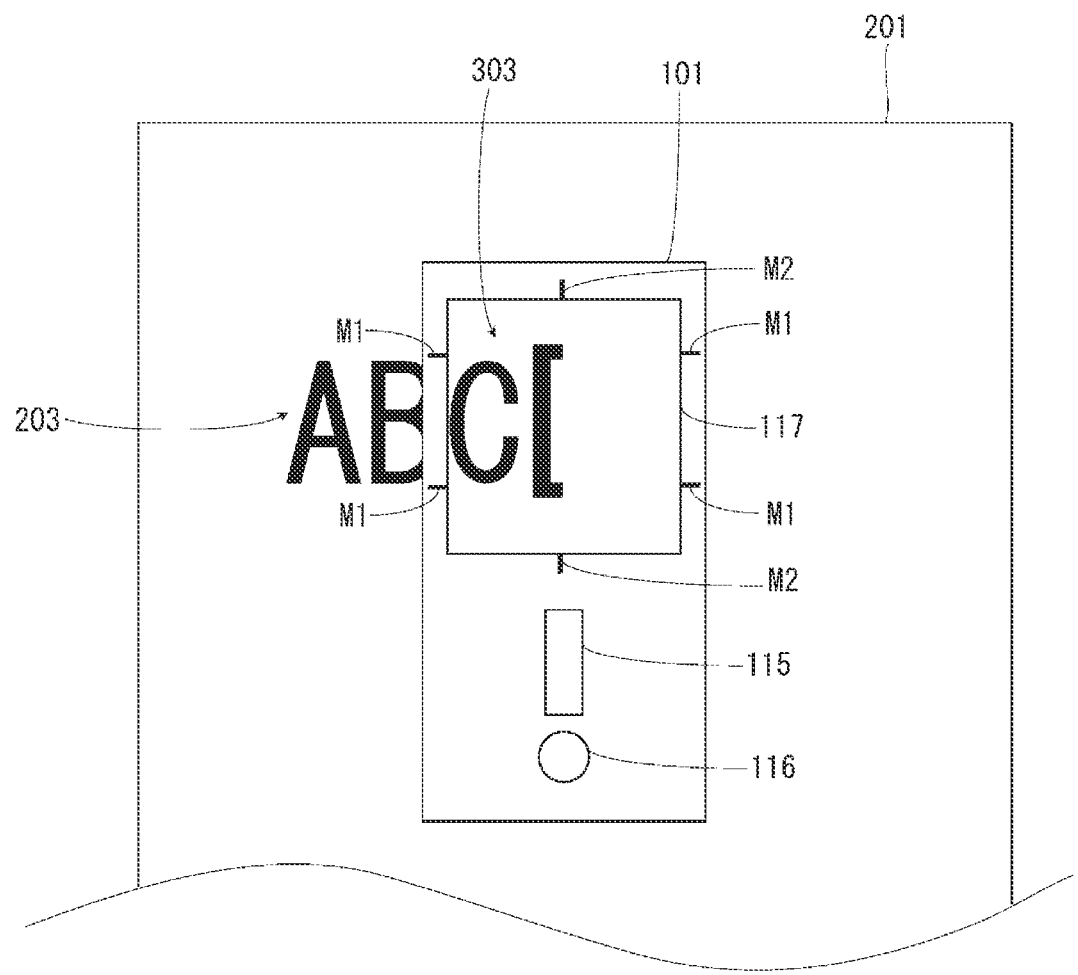
FIG. 19 is an explanatory view of Modification Example 4.

The printing device 101 in Modification Example 3 displays the entirety of the display image 303 in a larger size than the print image 203. However, the printing device 101 may display, in a larger size, only a part corresponding to the current printing position 311 in the print image 203, of the display image 303. For example, as shown in FIG. 19, the printing device 101 may display only the letter corresponding to the current printing position 311 in the print image 203, of the plurality of letters included in the display image 303, in a larger size than the print image 203. In this way, according to this modification example, the user 301 can check the part corresponding to the current printing position 311 in the print image 203, of the display image 303, more in detail than when the part corresponding to the current printing position 311 in the print image 203, of the display image 303, is displayed in the same size as the other parts.

Figure 20:
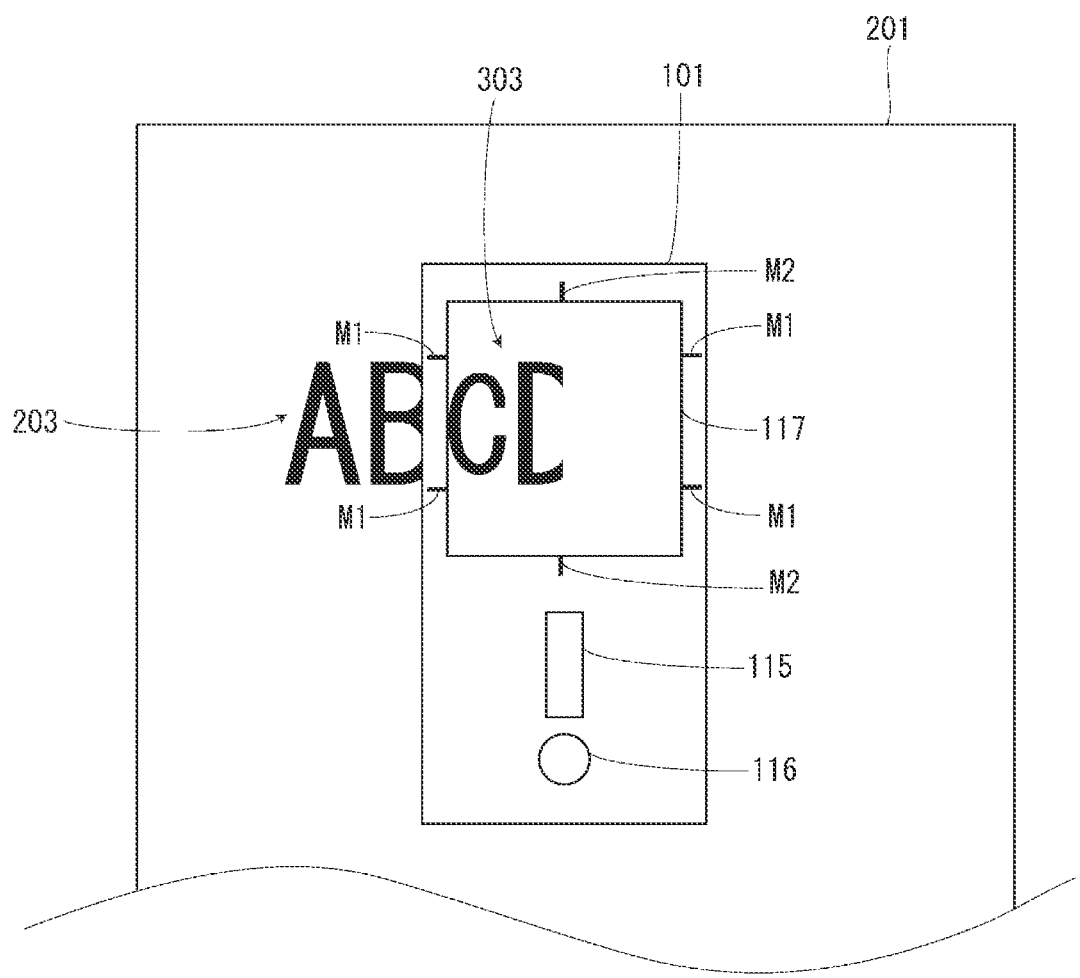
FIG. 20 is an explanatory view of another modification example of FIG. 10.

In another modification example, as shown in FIG. 20, the printing device 101 may display only the letter "D" corresponding to the current printing position 311 in the print image 203, of the plurality of letters included in the display image 303, in the same size as the print image 203, and display the other letters in a smaller size than the print image 203.

In still another modification example, the printing device 101 may display an image included in a predetermined area around the specified position on the display 117 that corresponds to the current printing position 311 in the print image 203, of the display image 303, in a larger size than an image included in the other areas, instead of changing the size of the plurality of letters included in the display image 303, letter by letter. The predetermined area is a smaller area than the display area of the display 117. In this case, the predetermined area around the specified position on the display 117 is equivalent to the "part corresponding to the current printing position 311 in the print image 203, of the display image 303".

Modification Example 5

Figure 21:
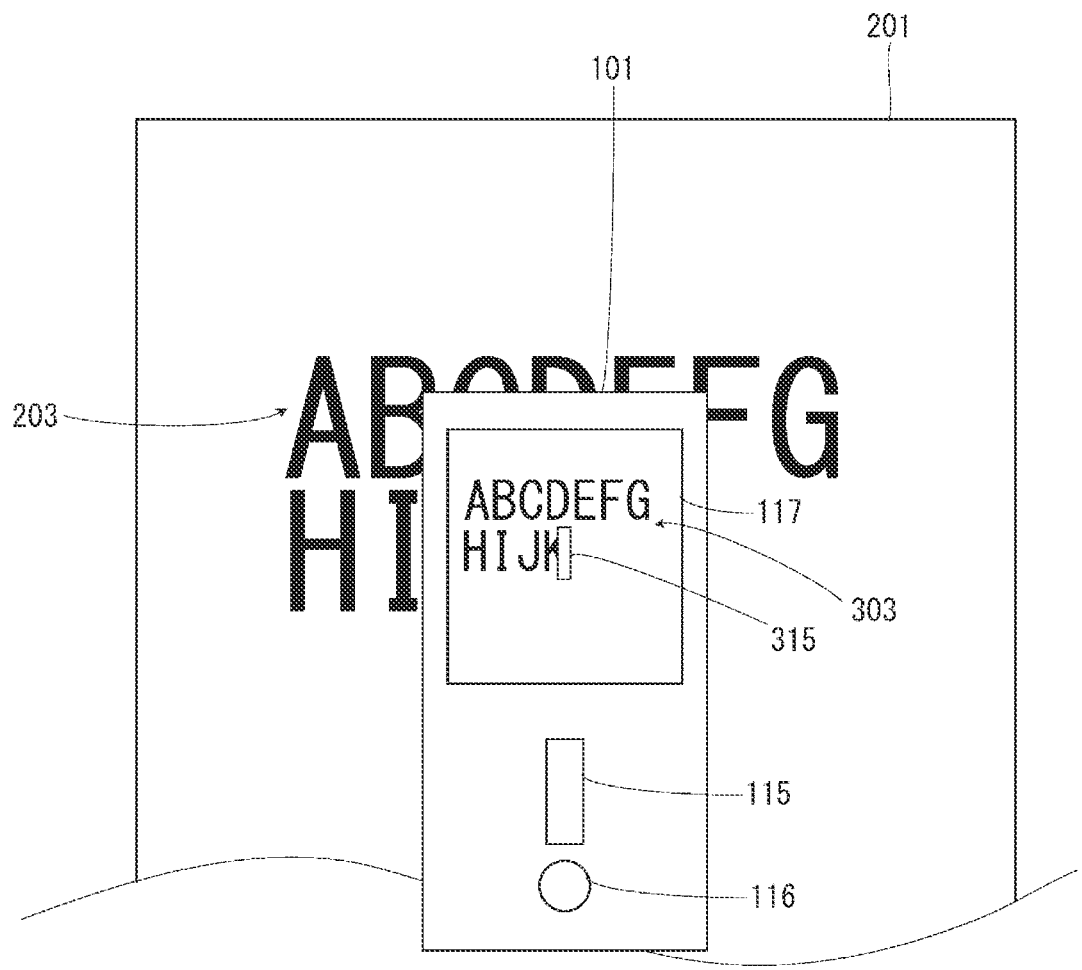
FIG. 21 is an explanatory view of Modification Example 5.

The printing device 101 in the embodiment displays the display image 303 in such a way that the position in the display image 303 corresponding to the current printing position 311 in the print image 203 coincides with the specified position on the display 117. However, the printing device 101 may display the display image 303 in such a way that the position in the display image 303 corresponding to the current printing position 311 in the print image 203 does not coincide with the specified position on the display 117. For example, while printing the letter "K" in the case of printing the print image 203 including the two lines of letter strings "ABCDEFG" and "HIJKLMN", the printing device 101 may cause the display 117 to display the display image 303 shown in FIG. 21. That is, the printing device 101 may cause the display 117 to display the display image 303 corresponding to the entirety of a printed part of the print image 203 and indicate the position corresponding to the current printing position 311 in the print image 203 with a cursor 315. In this case, the cursor 315 is moved within the display area of the display 117 as the printing proceeds. However, the printing device 101 need not necessarily cause the display 117 to display the display image 303 corresponding to the entirety of the printed part of the print image 203 and may cause the display 117 to display the display image 303 corresponding to apart including the current printing position 311 in the print image 203, of the printed part of the print image 203.

Modification Example 6

Figure 22:
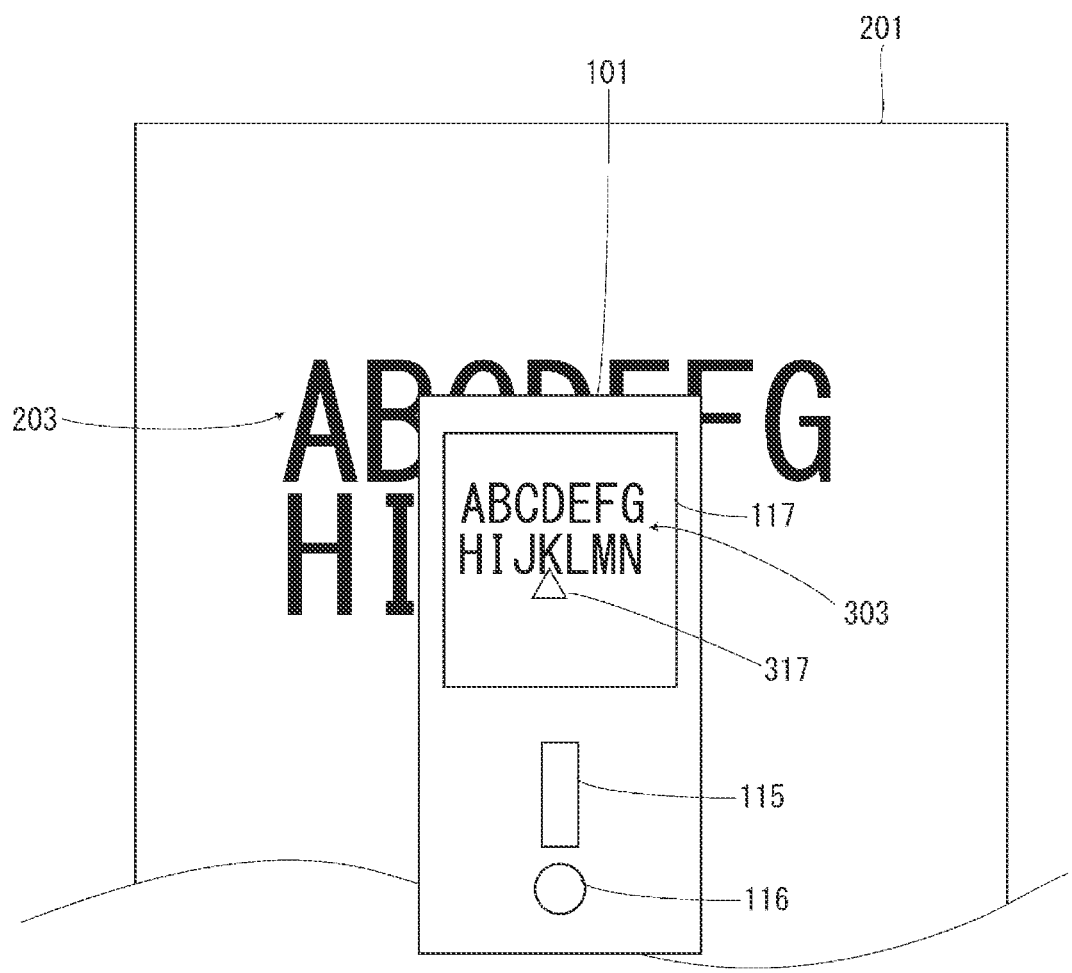
FIG. 22 is an explanatory view of Modification Example 6.

The printing device 101 in the embodiment causes the display 117 to display the display image 303 corresponding to a printed part of the print image 203. However, the printing device 101 may cause the display 117 to display the display image 303 including the display image 303 corresponding to a part yet to be printed of the print image 203. For example, while printing the letter "K" in the case of printing the two letter strings "ABCDEFG" and "HIJKLMN", the printing device 101 may cause the display 117 to display the display image 303 shown in FIG. 22. In the example shown in FIG. 22, the printing device 101 causes the display 117 to display the display image 303 corresponding to the entirety of the print image 203. The printing device 101 also displays a current position mark 317 at a position in the display image 303 corresponding to the current printing position 311 in the print image 203.

In another modification example, the printing device 101 may display a letter corresponding to the current printing position 311 in the print image 203, of the plurality of letters included in the display image 303, in a different display form from the other letters. For example, the printing device 101 may display the letter corresponding to the current printing position 311 in a different color or a different size from the other letters.

In still another modification example, the printing device 101 may display a letter or image showing the state of progress of the printing of the print image 203, as the display image 303 showing the current printing position 311 in the print image 203. For example, the printing device 101 may display letters or an image showing "5 cm to finish printing" or "printing 70% completed", as the display image 303.

Modification Example 7

The printing device 101 in the embodiment stops printing when determining that the distance from the medium 201 is longer than the distance L1, and does not perform the subsequent printing. However, the printing device 101 may temporarily suspend printing when determining that the distance from the medium 201 is longer than the distance L1, and may resume the printing when determining again that the distance from the medium 201 is equal to or shorter than the distance L1.

Modification Example 8

Figure 23:
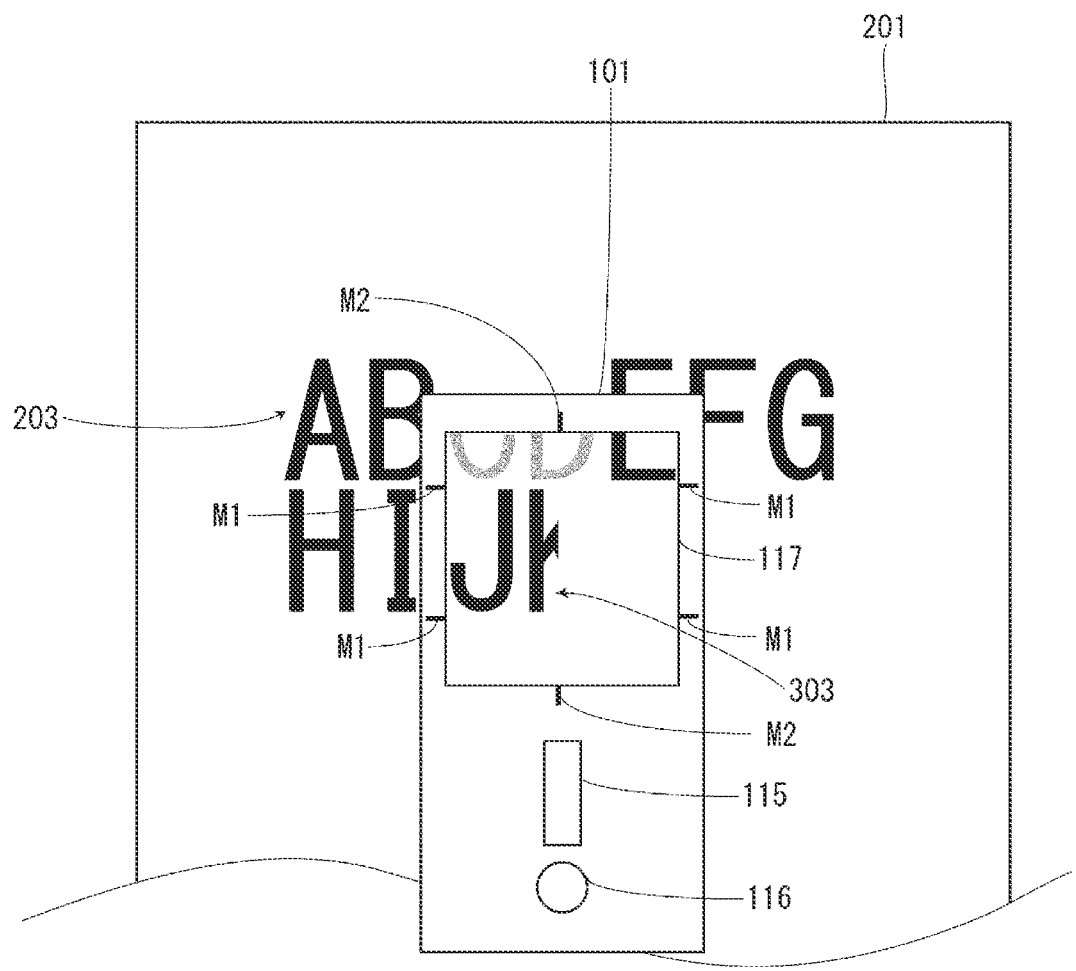
FIG. 23 is an explanatory view of Modification Example 8.

When the printing device 101 in Modification Example 7 prints a plurality of letters, the printing device 101 may display a first letter, which is a letter in the display image 303 corresponding to a letter printed when it is determined that the distance from the medium 201 is equal to or shorter than the distance L1, and a second letter, which is a letter in the display image 303 corresponding to a letter to be printed when it is determined that the distance from the medium 201 is longer than the distance L1, in such a way that the user 301 can distinguish the first letter and the second letter from each other. For example, in the case of printing the print image 203 shown in FIG. 14, when the distance between the printing device 101 and the medium 201 becomes longer than the distance L1 during a period from the start of the printing of the letter "C" to the end of the printing of the letter "D", the printing device 101 causes the display 117 to display the display image 303 shown in FIG. 23. Of the letters included in the display image 303 shown in FIG. 23, the letter "C" and the letter "D" are second letters and the other letters are first letters. In the example shown in FIG. 23, the printing device 101 displays the first letters in a normal color and displays the second letters in a lighter color than the normal color. In this way, according to this modification example, the user 301 can grasp which letter of the letters included in the print image 203 is not properly printed, based on the display image 303.

Modification Example 9

Figure 24:
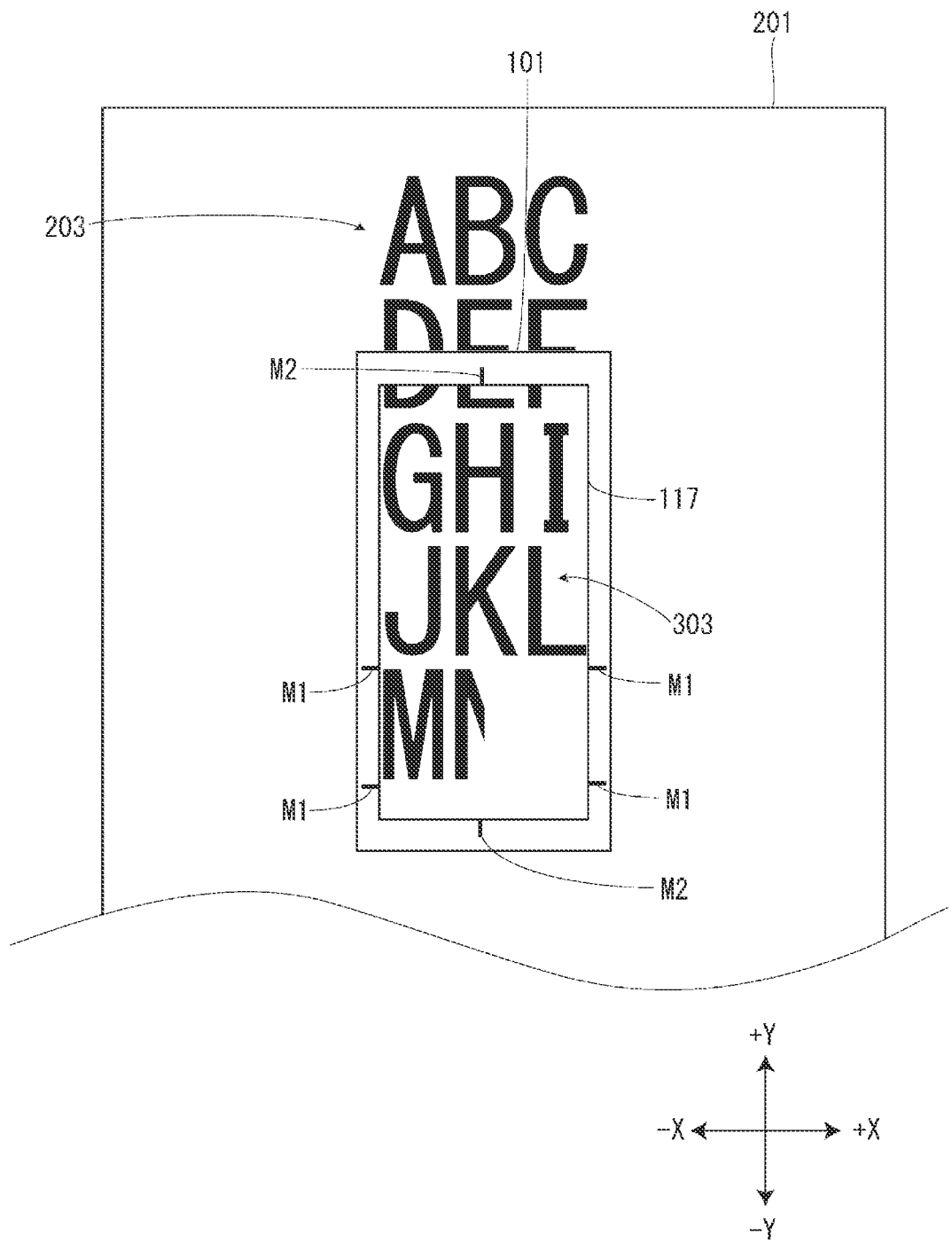
FIG. 24 is an explanatory view of Modification Example 9.

In the printing device 101 in the embodiment, the display 117 is provided in a partial area in the +Y-direction on the first outer surface 103. However, the display 117 may be provided substantially in the entire area on the first outer surface 103, as shown in FIG. 24. In this case, the print button 115 and the power button 116 are provided at an outer surface other than the first outer surface 103 of the printing device 101. Also, in this case, the printing device 101 may preferably display the display image 303 in such a way that the specified position on the display 117 is located further in the −Y-direction on the display 117. The printing device 101 may preferably be provided with four first marks M1 corresponding to the specified position on the display 117. This configuration enables the user 301 to grasp up to which line the printing is finished, even when a printed letter string is invisible as it is covered by the casing of the printing device 101 in the case of printing the print image 203 including many lines of letter strings, as shown in FIG. 24.

Modification Example 10

In the printing device 101 in the embodiment, the range of the plurality nozzles included in the nozzle array 127 is defined as the printable range P (see FIG. 4). However, a range excluding a nozzle or nozzles at the end in the +Y-direction and the end in the −Y-direction, of the plurality of nozzles, may be defined as the printable range P. In this case, the nozzle or nozzles at the end in the +Y-direction and the end in the −Y-direction are used to compensate for a shift of the printing device 101 in the +Y-direction or the −Y-direction, when such a shift occurs while the printing device 101 is moved in the +X-direction or the −X-direction.

Modification Example 11

The printing device 101 may notify an error when determining that the distance from the medium 201 is longer than the distance L1. For example, an LED may be built in the print button 115, and the printing device 101 may turn on or turn on and off the LED built in the print button 115 to give an error notification. Alternatively, the printing device 101 may temporarily display an error message on the display 117 and subsequently hide the display image 303.

In another modification example, the printing device 101 may notify an error via a sound or vibration.

In still another modification example, the information processing device 1 may give an error notification. In this case, the information processing device 1 may display an error message to the effect that printing is stopped because the printing device 101 is moved away from the medium 201, on the operation/display unit 11, based on a print stop notification received from the printing device 101.

Modification Example 12

The printing device 101 in the embodiment acquires a print job from the information processing device 1. However, the printing device 101 may acquire a print job from an external storage medium such as a flash memory.

In another modification example, the printing device 101 may generate a print job by itself.

Modification Example 13

The printing device 101 in the embodiment receives a print job including a plurality of path-based print jobs from the information processing device 1, when printing the print image 203 in a plurality of paths. However, the printing device 101 may receive path-based jobs one by one. In this case, the printing device 101 may request a path-based job for the next path from the information processing device 1, on accepting a print start instruction or on finishing printing a path.

Modification Example 14

The amount of movement and the direction of movement of the printing device 101 may be detected, using not only an output signal from the movement detection sensor 125 but also an output signal from a gyro sensor detecting an angular velocity of the printing device 101.

Modification Example 15

The print head 121 is not limited to an inkjet head and may be, for example, a thermal head that prints in a thermal transfer method. The print head 121 may also eject other liquids than ink. For example, the print head 121 may eject a liquid such as an adhesive or coating agent.

In another modification example, the print head 121 may be configured to be attachable to and removable from the printing device 101, along with an ink cartridge containing a liquid.

Modification Example 16

The information processing device 1 may be able to accept a selection of a font size or decorative font on the print instruction screen 21, when the text option 23*a* is selected in the print type selection section 23 on the print instruction screen 21. In this case, the information processing device 1 may generate a print job for printing the print image 203, based on the font size or decorative font of the accepted selection.

Modification Example 17

The printing device 101 may be not equipped with the display 117, and the printing device 101 may cause the operation/display unit 11 of the information processing device 1 to display the display image 303. In this case, after starting printing, the printing device 101 may periodically transmit display data for causing the operation/display unit 11 to display the display image 303, to the information processing device 1. The information processing device 1 may cause the operation/display unit 11 to display the display image 303, based on the display data transmitted from the printing device 101.

In another modification example, the information processing device 1 may receive information based on the result of detection by the movement detection sensor 125 from the printing device 101 and cause the operation/display unit 11 to display the display image 303 based on the received information. The information based on the result of detection by the movement detection sensor 125 refers to a movement detection signal itself, outputted from the movement detection sensor 125, or information representing the amount of movement and the direction of movement of the printing device 101 detected based on the movement detection signal, or the like.

Modification Example 18

Also, suitable changes can be made without departing from the spirit and scope of the present disclosure, such as a configuration formed of the embodiment and a modification example combined together, or a configuration formed of modification examples combined together.

SUPPLEMENTARY NOTES

Supplementary notes on the printing device and the control method for a printing device are given below.

A printing device 101 printing on a medium while being manually moved in relation to the medium is provided. The printing device 101 includes: a movement detection unit 181 detecting an amount of movement of the printing device 101 in relation to the medium; a print head; a display unit; a printing control unit 185 causing the print head to print a print image 203 according to the amount of movement of the printing device 101 detected by the movement detection unit 181; and a display control unit 187 causing the display unit to display a display image 303 showing a current printing position in the print image 203 according to the amount of movement of the printing device 101 detected by the movement detection unit 181.

A control method for a printing device 101 printing on a medium while being manually moved in relation to the medium is provided. The control method executes: causing a print head to print a print image 203 according to an amount of movement of the printing device 101 in relation to the medium; and causing a display unit to display a display image 303 showing a current printing position in the print image 203 according to the amount of movement of the printing device 101 in relation to the medium.

According to this configuration, the printing device 101 causes the display unit to display the display image 303 showing the current printing position in the print image 203 according to the amount of movement of the printing device 101 detected by the movement detection unit 181. This enables the user to grasp the current printing position in the print image 203 and therefore reduce a wrong operation due to being unable to grasp the current printing position in the print image 203.

In the printing device 101, the display control unit 187 may display an image corresponding to a printed part including the current printing position, of the print image 203, as the display image 303, and cause the display unit to display the display image 303 in such a way that the position in the display image 303 corresponding to the current printing position in the print image 203 coincides with a specified position on the display unit.

According to this configuration, the printing device 101 displays the image corresponding to the printed part including the current printing position, of the print image 203, as the display image 303, and displays the display image 303 in such a way that the position in the display image 303 corresponding to the current printing position in the print image 203 coincides with the specified position on the display unit. Thus, the user can check, as the display image 303, a video image that looks as if the print image 203 is picked up from the printing device 101 that is moved.

The printing device 101 may further include a distance detection unit 183 detecting a distance from the medium. The display control unit 187 may change the display image 303 according to the distance detected by the distance detection unit 183.

This configuration enables the user to grasp the distance from the medium, based on the change in the display image 303. This also enables the user to grasp that moving the printing device 101 away from the medium may cause a trouble.

In the printing device 101, the display control unit 187 may gradually hide the display image 303 as the distance detected by the distance detection unit 183 becomes longer.

This configuration enables the user to grasp the distance from the medium, based on the change in the display image 303 being gradually hidden.

In the printing device 101, the display control unit 187 may display an image corresponding to the print image 203, as the display image 303, and display the display image 303 in a larger size than the print image 203.

This configuration enables the user to check the display image 303 more in detail than when the display image 303 is displayed in the same size as the print image 203.

In the printing device 101, the display control unit 187 may display an image corresponding to the print image 203, as the display image 303, and display a part corresponding to the current printing position in the print image 203, of the display image 303, in a larger size than other parts.

This configuration enables the user to check the part corresponding to the current printing position in the print image 203, of the display image 303, more in detail than when the part corresponding to the current printing position in the print image 203 is displayed in the same size as the other parts.

In the printing device 101, the display unit may be provided at a position corresponding to the print head, on an opposite surface that is an outer surface opposite to an outer surface where the print head is provided, of a plurality of outer surfaces of the printing device 101.

According to this configuration, the printing device 101 causes the display unit to display the display image 303 in substantially the same size as the print image 203. Thus, the user can check the display image 303 as if viewing the print image 203 through the printing device 101.

What is claimed is:

1. A printing device printing on a medium while being manually moved in relation to the medium, the printing device comprising:
    a detector detecting an amount of movement of the printing device in relation to the medium;
    a print head;
    a display; and
    a controller causing the print head to print a print image according to the amount of movement of the printing device detected by the detector, and causing the display to display a display image showing a current printing position in the print image according to the amount of movement of the printing device detected by the detector,
    wherein printing is executed by the movement of the printing device, in relation to the medium, in a first direction, and a new line is executed by the movement of the printing device, in relation to the medium, in a second direction,
    wherein the detector detects a distance, in a third direction intersecting the first direction and the second direction, from the medium,
    wherein the controller changes the display image according to the distance, in the third direction, detected by the detector, and
    wherein the controller gradually hides the display image as the distance detected by the detector becomes longer.

2. The printing device according to claim 1, wherein the control displays an image corresponding to a printed part including the current printing position, of the print image, as the display image, and causes the display to display the display image in such a way that a position in the display image corresponding to the current printing position in the print image coincides with a specified position on the display.

3. The printing device according to claim 1, wherein the controller displays an image corresponding to the print image, as the display image, and displays the display image in a larger size than the print image.

4. The printing device according to claim 1, wherein the controller displays image corresponding to the print image, as the display image, and displays a part corresponding to the current printing position in the print image, of the display image, in a larger size than other parts.

5. The printing device according to claim 1, wherein the display is provided at a position corresponding to the print head, on an opposite surface that is an outer surface opposite to an outer surface where the print head is provided, of a plurality of outer surfaces of the printing device.

6. A control method for a printing device printing on a medium while being manually moved in relation to the medium, the control method executing:
   printing, by a print head, a print image according to an amount of movement of the printing device in relation to the medium; and
   displaying, by a display, a display image showing a current printing position in the print image according to the amount of movement of the printing device in relation to the medium,
   wherein printing is executed by the movement of the printing device, in relation to the medium, in a first direction, and a new line is executed by the movement of the printing device, in relation to the medium, in a second direction,
   wherein the control method further comprising:
   detecting distance, in a third direction intersecting the first direction and the second direction, from the medium; and
   changing the display image according to the detected distance in the third direction, the change comprising gradually hiding the display image as the detected distance becomes longer.

* * * * *